(12) United States Patent
Yu et al.

(10) Patent No.: US 12,451,992 B2
(45) Date of Patent: *Oct. 21, 2025

(54) DATA PROCESSING METHOD AND APPARATUS

(71) Applicant: HUAWEI TECHNOLOGIES CO., LTD., Guangdong (CN)

(72) Inventors: Jian Yu, Shenzhen (CN); Ming Gan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/425,899

(22) Filed: Jan. 29, 2024

(65) Prior Publication Data

US 2024/0171310 A1  May 23, 2024

Related U.S. Application Data

(63) Continuation of application No. 17/859,702, filed on Jul. 7, 2022, now Pat. No. 11,943,052, which is a (Continued)

(30) Foreign Application Priority Data

Jan. 8, 2020 (CN) .......................... 202010019316.0

(51) Int. Cl.
*H04L 1/00* (2006.01)
*H04L 5/00* (2006.01)

(52) U.S. Cl.
CPC .......... *H04L 1/0071* (2013.01); *H04L 1/0041* (2013.01); *H04L 1/0045* (2013.01); *H04L 1/0057* (2013.01); *H04L 5/0053* (2013.01)

(58) Field of Classification Search
CPC ... H04L 1/0041; H04L 1/0045; H04L 1/0057; H04L 1/0071; H04L 5/003; H04L 5/0053; H04L 5/0058
See application file for complete search history.

(56) References Cited

U.S. PATENT DOCUMENTS 9,647,822 B2 * 5/2017 Niemela ................... H04L 5/22
2015/0365195 A1 12/2015 Yang et al.
(Continued)

FOREIGN PATENT DOCUMENTS

| CN | 106664185 A | 5/2017 |
| CN | 107733557 A | 2/2018 |

(Continued)

OTHER PUBLICATIONS

EP Communication Pursuant to Article 94(3) EPC in European Appln No. 20912670.5, dated Sep. 24, 2024, 9 pages.
(Continued)

*Primary Examiner* — Shelly A Chase
(74) *Attorney, Agent, or Firm* — Fish & Richardson P.C.

(57) ABSTRACT

Embodiments of this application provide data processing methods, computer program products, computer-readable storage medium and apparatuses. In an embodiment, a method includes: inputting bits in a coded bitstream into a first interleaver, wherein the coded bitstream is allocated to a first resource unit (RU) for a first user, wherein the first RU comprises M RUs, and M is an integer greater than 1, and reordering the bits in the coded bitstream by using the first interleaver, wherein a number $N_{SD}$ of data subcarriers of the first interleaver is a positive integer within $[N_{SD\_min}/Q, N_{SD\_max}/Q]$, wherein $N_{SD\_min}$ is a sum of data subcarriers comprised in the first RU, $N_{SD\_max}$ is a sum of subcarriers comprised in the first RU, and Q is a number of data subcarriers to which a bit is mapped.

26 Claims, 18 Drawing Sheets

```
┌─ 1001
│ Allocate a coded bitstream of a first user to M RUs or a first RU including
│ M RUs, where the M RUs or the first RU is an RU allocated to the first
│ user, and M is a positive integer greater than 1
└─

▼
┌─ 1002
│ Reorder all bits in the coded bitstream by using a first interleaver or a first
│                              tone mapper
└─
```

Related U.S. Application Data continuation of application No. PCT/CN2020/140439, filed on Dec. 28, 2020.

(56) References Cited

U.S. PATENT DOCUMENTS

| | | | |
|---|---|---|---|
| 2015/0365203 | A1 | 12/2015 | Suh et al. |
| 2017/0034317 | A1 | 2/2017 | Kenney et al. |
| 2017/0180177 | A1 | 6/2017 | Wu et al. |
| 2018/0248591 | A1 | 8/2018 | Geng et al. |
| 2019/0090224 | A1 | 3/2019 | Choi et al. |
| 2019/0238288 | A1 | 8/2019 | Liu et al. |
| 2021/0044398 | A1* | 2/2021 | Noh ............... H04L 1/0041 |
| 2021/0281372 | A1 | 9/2021 | Liu et al. |
| 2021/0337546 | A1 | 10/2021 | Kim et al. |

FOREIGN PATENT DOCUMENTS

| | | |
|---|---|---|
| CN | 108206727 A | 6/2018 |
| CN | 108886420 A | 11/2018 |
| JP | 2017530599 A | 10/2017 |
| JP | 2017532817 A | 11/2017 |
| RU | 2406227 C2 | 12/2010 |
| WO | 2019089207 A1 | 5/2019 |
| WO | 2019173240 A1 | 9/2019 |

OTHER PUBLICATIONS

Office Action in Korean Appln. No. 10-2022-7026725, mailed on Sep. 10, 2024, 10 pages (with English translation).
Extended European Search Report in European Appln No. 20912670.5, dated Dec. 13, 2022, 17 pages.
IEEE P802.11 be/D0.1, "Draft Standard for Information Technology—Tele-Communications and Information Exchange Between Systems Local and Metropolitan Area Networks—Specific Requirements, Part 11: Wireless LAN Medium Access Control (MAC) and Physical Layer (PHY) Specifications," Sep. 2020, 299 pages.
IEEE P802.11ax/D4.3, "Draft Standard for Information Technology—Tele-Communications and Information Exchange Between Systems Local and Metropolitan Area Networks—Specific Requirements, Part 11: Wireless LAN Medium Access Control (MAC) and Physical Layer (PHY) Specifications," Aug. 2019, 782 pages.
IEEE P802.11ax/D6.0, "Draft Standard for Information Technology—Tele-Communications and Information Exchange Between Systems Local and Metropolitan Area Networks—Specific Requirements, Part 11: Wireless LAN Medium Access Control (MAC) and Physical Layer (PHY) Specifications," Nov. 2019, 780 pages.
IEEE Std 802.11-2016, "IEEE Standard for Information Technology—Telecommunications and Information Exchange Between Systems Local and Metropolitan Area Networks—Specific Requirements, Part 11: Wireless LAN Medium Access Control (MAC) and Physical Layer (PHY) Specifications," Dec. 7, 2016, 3534 pages.
International Search Report and Written Opinion in International Appln. No. PCT/CN2020/140439, mailed on Apr. 1, 2021, 15 pages (with English translation).
Office Action in Japanese Appln. No. 2022-541939, mailed on Oct. 3, 2023, 17 pages (with English translation).
Qi et al., "Interleaver for Nss>4," IEEE 802.11-11/0048r0, Jan. 18, 2011, 38 pages.
Sun et al., "Interleaver and Tone Mapper for OFDMA," IEEE 802.11-15/0816r0, Jul. 2015, 35 pages.
Yu et al., "Multiple RU Discussion," IEEE 802.11-19/1914r0, Nov. 6, 2019, 7 pages.
Yu et al., "Multiple RU Discussion," IEEE 802.11-19/1914r1, Nov. 6, 2019, 8 pages.
Office Action in Russian Appln. No. 2022121235/07(044842), mailed on Aug. 1, 2024, 23 pages (with English translation).

* cited by examiner

DATA PROCESSING METHOD AND APPARATUS

CROSS-REFERENCE TO RELATED APPLICATIONS

This application is a continuation of U.S. patent application Ser. No. 17/859,702, filed on Jul. 7, 2022, which is a continuation of International Application No. PCT/CN2020/140439, filed on Dec. 28, 2020. The International Application claims priority to Chinese Patent Application No. 202010019316.0, filed on Jan. 8, 2020. All of the aforementioned patent applications are hereby incorporated by reference in their entireties.

TECHNICAL FIELD

This application relates to the field of wireless communication technologies, and in particular, to a data processing method and apparatus.

BACKGROUND

In a communication system, channel coding is generally used to improve data transmission reliability and ensure communication quality. On a fading channel, bit errors (namely, burst errors) often occur in strings, and channel coding is effective only in detection and correction of a single error or an error string that is not very long. Therefore, in a conventional technology, a bit sequence in a bitstream is usually scrambled before the bitstream is transmitted. In this way, a probability of a data burst error can be reduced, and even if an error occurs, the error is a single error or an error string with an extremely short length. In this way, an error correction capability of channel coding can be used to correct the error, so that an original bit sequence can be restored. Currently, there are mainly the following two methods for scrambling the bit sequence in the bitstream: (1) For a bitstream of binary convolutional code (BCC) coding, before constellation mapping, an interleaver (such as a row/column interleaver or a random interleaver) is used to interleave bits in the bitstream. (2) For a bitstream of low-density parity check code (LDPC) coding, after constellation mapping, bits are scrambled by using an LDPC tone mapper.

Currently, one RU is usually allocated to one user, and the interleaver or the LDPC tone mapper performs an operation in one RU. In other words, for bits in different RUs, different interleavers need to be used for interleaving or different LDPC tone mappers need to be used for tone mapping.

However, in a next-generation wireless local area network (WLAN) standard 802.11be, for an orthogonal frequency division multiple access (OFDMA) system, allocation of a plurality of RUs to one user needs to be supported. However, there is no specific solution to how to design an interleaver or an LDPC tone mapper for a user to whom a plurality of RUs are allocated.

SUMMARY

Embodiments of this application provide a data processing method and apparatus, to scramble, by using one interleaver or one LDPC tone mapper, a bit sequence of a bitstream of a user to whom a plurality of RUs are allocated, so that hardware costs are reduced.

According to a first aspect, a data processing method is provided in an embodiment of this application, and may be applied to a transmit end. The method includes: allocating a coded bitstream of a first user to M resource units (RU) or a first RU including M RUs, where the M RUs or the first RU is an RU allocated to the first user, and M is a positive integer greater than 1; and reordering all bits in the coded bitstream by using a first interleaver or a first tone mapper.

In this embodiment of this application, when the M RUs or the first RU including M RUs is allocated to the first user, the coded bitstream of the first user is first allocated to the M RUs or the first RU including M RUs, and then a unified first interleaver or a unified first tone mapper is used to reorder all the bits in the coded bitstream, so that hardware costs can be reduced.

According to a second aspect, a data processing method is provided in an embodiment of this application, and may be applied to a transmit end. The method includes: inputting all bits in a coded bitstream of a first user into a first interleaver or a first tone mapper, where M RUs or a first RU including M RUs is allocated to the first user, and M is a positive integer greater than 1; and reordering all bits in the coded bitstream by using the first interleaver or the first tone mapper.

In this embodiment of this application, when the M RUs or the first RU including M RUs is allocated to the first user, all the bits in the coded bitstream of the first user are directly input into a unified first interleaver or a unified first tone mapper, and then the first interleaver or the first tone mapper is used to reorder all the bits in the coded bitstream, so that hardware costs can be reduced.

With reference to the method according to the first aspect or the second aspect of embodiments of this application, in a possible design, the allocating a coded bitstream of a first user to M RUs or a first RU including M RUs includes: sequentially and alternately allocating, in a bit sequence to the M RUs or the first RU including M RUs, the coded bitstream of the first user that is output by a stream parser.

In this way, a bit allocator can be saved, and the hardware costs can be further reduced.

With reference to the method according to the first aspect or the second aspect of embodiments of this application, in a possible design, a value of a number $N_{SD}$ of data subcarriers of the first interleaver or the first tone mapper is any positive integer in $[N_{SD\_min}/Q, N_{SD\_max}/Q]$, where $N_{SD\_min}$ is a sum of numbers of data subcarriers included in all the M RUs, $N_{SD\_max}$ is a sum of numbers of subcarriers included in all the M RUs, and Q is a number of data subcarriers to which one data bit is mapped.

In this way, the number $N_{SD}$ of data subcarriers of the first interleaver or the first tone mapper may be flexibly selected from $[N_{SD\_min}/Q, N_{SD\_max}/Q]$ based on a requirement, so that flexibility of this solution can be improved.

With reference to the method according to the first aspect or the second aspect of embodiments of this application, in a possible design, a number $N_{COL}$ of columns and a number $N_{ROW}$ of rows of the first interleaver meet the following relationship:

$$(N_{COL} \times N_{ROW})/N_{BPSCS} = N_{SD}, \text{ where}$$

$N_{BPSCS}$ is a number of coded bits carried on each subcarrier of each spatial data stream.

In this way, it is ensured that values of the number $N_{COL}$ of columns and the number $N_{ROW}$ of rows of the first interleaver are reliable, and the first interleaver can accurately perform interleaving.

With reference to the method according to the first aspect or the second aspect of embodiments of this application, in a possible design, if the coded bitstream includes a plurality of spatial data streams, the method further includes: determining a frequency rotation parameter $N_{ROT}$ of the first interleaver in any one of the following manners.

Manner 1: $N_{ROT}$ is determined based on a formula $$N_{ROT} = \text{floor}\left(\frac{N_{SD}}{4}\right).$$

Manner 2: A positive integer that enables a packet error rate (PER) of a receive end to be minimum or a positive integer that enables a signal-to-noise ratio (SNR) required when a PER of a receive end is a preset value to be minimum is selected from $[N_{ROT\_min}, N_{ROT\_max}]$ as $N_{ROT}$, where $N_{ROT\_min}$ is a frequency rotation parameter of a second interleaver corresponding to an RU in which a number of included data subcarriers is less than $N_{SD}$ and is the closest to $N_{SD}$, and $N_{ROT\_max}$ is a frequency rotation parameter of a third interleaver corresponding to an RU in which a number of included data subcarriers is greater than $N_{SD}$ and is the closest to $N_{SD}$.

Two methods for determining the frequency rotation parameter $N_{ROT}$ of the first interleaver are provided in this implementation, so that flexibility of this solution is improved.

With reference to the method according to the first aspect or the second aspect of embodiments of this application, in a possible design, the M RUs include one 26-tone resource unit (26-tone RU) and one 52-tone RU.

When a dual-carrier modulation mode is not used, $N_{SD}=72$, $N_{COL}=18$, $N_{ROW}=4 \times N_{BPSCS}$, and $N_{ROT}=18$.

When the dual-carrier modulation mode is used, $N_{SD}=36$, $N_{COL}=9$, $N_{ROW}=4 \times N_{BPSCS}$, and $N_{ROT}=9$; or $N_{SD}=36$, $N_{COL}=18$, $N_{ROW}=2 \times N_{BPSCS}$, and $N_{ROT}=9$.

In this implementation, a method for designing a parameter of the first interleaver that performs unified interleaving for the 26-tone RU and the 52-tone RU is provided, so that hardware costs of the interleaver can be effectively reduced.

With reference to the method according to the first aspect or the second aspect of embodiments of this application, in a possible design, the M RUs include one 26-tone RU and one 106-tone RU.

When a dual-carrier modulation mode is not used, $N_{SD}$ is 126 or 128; and if $N_{SD}=126$, $N_{COL}=18$, $N_{ROW}=7 \times N_{BPSCS}$, and $N_{ROT}$ is a positive integer from 29 to 58 (including 29 and 58); or if $N_{SD}=128$, $N_{COL}=16$, $N_{ROW}=8 \times N_{BPSCS}$, and $N_{ROT}$ is a positive integer from 29 to 58 (including 29 and 58).

When the dual-carrier modulation mode is used, $N_{SD}$ is 63 or 64; and if $N_{SD}=63$, $N_{COL}=9$, $N_{ROW}=7 \times N_{BPSCS}$, and $N_{ROT}$ is a positive integer from 11 to 29; or if $N_{SD}=64$, $N_{COL}=16$, $N_{ROW}=4 \times N_{BPSCS}$, and $N_{ROT}$ is a positive integer from 11 to 29.

In this implementation, a method for designing a parameter of the first interleaver that performs unified interleaving for the 26-tone RU and the 106-tone RU is provided, so that hardware costs of the interleaver can be effectively reduced.

With reference to the method according to the first aspect or the second aspect of embodiments of this application, in a possible design, a tone mapping distance parameter $D_{TM}$ of the first tone mapper is a common divisor of $N_{SD}$, and $N_{SD}$ is a number of data subcarriers of the first tone mapper.

In this way, it is ensured that a value of the tone mapping distance parameter $D_{TM}$ of the first tone mapper is reliable, and it is ensured that the first tone mapper can accurately perform tone mapping.

With reference to the method according to the first aspect or the second aspect of embodiments of this application, in a possible design, the method further includes: determining $D_{TM}$ in any one of the following manners.

Manner 1: A positive integer is selected from $[D_{TM\_min}, D_{TM\_max}]$ as $D_{TM}$, where $D_{TM\_min}$ is a tone mapping distance parameter corresponding to a second tone mapper corresponding to an RU in which a number of included data subcarriers is less than $N_{SD}$ and is the closest to $N_{SD}$, and $D_{TM\_max}$ is a tone mapping distance parameter corresponding to a third tone mapper corresponding to an RU in which a number of included data subcarriers is greater than $N_{SD}$ and is the closest to $N_{SD}$.

Manner 2: A positive integer that enables a PER of a receive end to be minimum or a positive integer that enables an SNR required when a PER of a receive end is a preset value to be minimum is selected from $[D_{TM\_min}, D_{TM\_max}]$ as $D_{TM}$.

Manner 3: A ratio $N_{SD}/N_{COL}$ of $N_{SD}$ to $N_{COL}$ of a first interleaver with a same RU size as the first tone mapper is used as $D_{TM}$.

Three methods for determining the tone mapping distance parameter $D_{TM}$ are provided in this implementation, so that flexibility of this solution is improved.

With reference to the method according to the first aspect or the second aspect of embodiments of this application, in a possible design, the M RUs include one 26-tone RU and one 52-tone RU.

When a dual-carrier modulation mode is not used, $N_{SD}=72$, and $D_{TM}$ is 4 or 6.

When the dual-carrier modulation mode is used, $N_{SD}=36$, and $D_{TM}$ is 2 or 3.

In this implementation, a method for designing a parameter of the first tone mapper that performs unified tone mapping for the 26-tone RU and the 52-tone RU is provided, so that hardware costs of the tone mapper can be effectively reduced.

With reference to the method according to the first aspect or the second aspect of embodiments of this application, in a possible design, the M RUs include one 26-tone RU and one 106-tone RU.

When a dual-carrier modulation mode is not used, $N_{SD}$ is 126 or 128; and if $N_{SD}=126$, $D_{TM}$ is 7 or 9; or if $N_{SD}=128$, $D_{TM}$ is 8.

When the dual-carrier modulation mode is used, $N_{SD}$ is 63 or 64; and if $N_{SD}=63$, $D_{TM}$ is 7 or 9; or if $N_{SD}=64$, $D_{TM}$ is 4 or 8.

In this implementation, a method for designing a parameter of the first tone mapper that performs unified tone mapping for the 26-tone RU and the 106-tone RU is provided, so that hardware costs of the tone mapper can be effectively reduced.

With reference to the method according to the first aspect or the second aspect of embodiments of this application, in a possible design, the M RUs are M 242-tone RUs.

When M=2, $N_{SD}$ is 468 and $D_{TM}$ is 12 when a dual-carrier modulation mode is not used, and $N_{SD}$ is 234 and $D_{TM}$ is 9 when the dual-carrier modulation mode is used.

When M=3, $N_{SD}$ is 702 and $D_{TM}$ is 13 or 18 when a dual-carrier modulation mode is not used, and $N_{SD}$ is 351 and $D_{TM}$ is 9 or 13 when the dual-carrier modulation mode is used.

When M=4, $N_{SD}$ is 980 and $D_{TM}$ is 20 when a dual-carrier modulation mode is not used, and $N_{SD}$ is 490 and $D_{TM}$ is 14 when the dual-carrier modulation mode is used.

In this implementation, a method for designing a parameter of the first tone mapper that performs unified tone mapping for a plurality of 242-tone RUs is provided, so that hardware costs of the tone mapper can be effectively reduced.

According to a third aspect, a data processing method is provided in an embodiment of this application, and may be applied to a transmit end. The method includes: dividing a total bandwidth of a first user into N sub-bandwidths, where at least one of the N sub-bandwidths includes a plurality of RUs; allocating a coded bitstream of the first user to the N sub-bandwidths; allocating a coded bitstream on a first sub-bandwidth to M RUs or a first RU including M RUS, where the first sub-bandwidth is any one of the at least one sub-bandwidth; and reordering all bits in all coded bitstreams on the first sub-bandwidth by using a first tone mapper.

In this embodiment of this application, the total bandwidth of the first user is first segmented (in other words, is divided into a plurality of sub-bandwidths), and then unified tone mapping is separately performed for an RU in each segment, so that flexibility of this solution is improved, and a problem that hardware costs of an LDPC tone mapper are high when the total bandwidth is relatively large is resolved.

According to a fourth aspect, a data processing method is provided in an embodiment of this application, and may be applied to a receive end. The method includes: obtaining a reordered bitstream of a first user from M RUs or a first RU including M RUs, where the M RUs or the first RU is an RU allocated to the first user, and M is a positive integer greater than 1; and restoring a sequence of all bits in the reordered bitstream by using a first deinterleaver or a first tone demapper.

In a possible design, a value of a number $N_{SD}$ of data subcarriers of the first deinterleaver or the first tone demapper is any positive integer in $[N_{SD\_min}/Q, N_{SD\_max}/Q]$, where $N_{SD\_min}$ is a sum of numbers of data subcarriers included in all the M RUs, $N_{SD\_max}$ is a sum of numbers of subcarriers included in all the M RUs, and Q is a number of data subcarriers to which one data bit is mapped.

In a possible design, a number $N_{COL}$ of columns and a number $N_{ROW}$ of rows of the first deinterleaver meet the following relationship:

$$(N_{COL} \times N_{ROW})/N_{BPSCS} = N_{SD}, \text{ where}$$

$N_{BPSCS}$ is a number of coded bits carried on each subcarrier of each spatial data stream.

In a possible design, if the coded bitstream includes a plurality of spatial data streams, the method further includes: determining a frequency rotation parameter $N_{ROT}$ of the first deinterleaver in any one of the following manners.

Manner 1: $N_{ROT}$ is determined based on a formula $$N_{ROT} = \text{floor}\left(\frac{N_{SD}}{4}\right).$$

Manner 2: A positive integer that enables a PER of the receive end to be minimum or a positive integer that enables an SNR required when a PER of the receive end is a preset value to be minimum is selected from $[N_{ROT\_min}, N_{ROT\_max}]$ as $N_{ROT}$, where $N_{ROT\_min}$ is a frequency rotation parameter of a second deinterleaver corresponding to an RU in which a number of included data subcarriers is less than $N_{SD}$ and is the closest to $N_{SD}$, and $N_{ROT\_max}$ is a frequency rotation parameter of a third deinterleaver corresponding to an RU in which a number of included data subcarriers is greater than $N_{SD}$ and is the closest to $N_{SD}$.

In a possible design, the M RUs include one 26-tone resource unit (26-tone RU) and one 52-tone RU.

When a dual-carrier modulation mode is not used, $N_{SD}=72$, $N_{COL}=18$, $N_{ROW}=4 \times N_{BPSCS}$, and $N_{ROT}=18$.

When the dual-carrier modulation mode is used, $N_{SD}=36$, $N_{COL}=9$, $N_{ROW}=4 \times N_{BPSCS}$, and $N_{ROT}=9$; or $N_{SD}=36$, $N_{COL}=18$, $N_{ROW}=2 \times N_{BPSCS}$, and $N_{ROT}=9$.

In a possible design, the M RUs include one 26-tone RU and one 106-tone RU.

When a dual-carrier modulation mode is not used, $N_{SD}$ is 126 or 128; and if $N_{SD}=126$, $N_{COL}=18$, $N_{ROW}=7 \times N_{BPSCS}$, and $N_{ROT}$ is a positive integer from 29 to 58 (including 29 and 58); or if $N_{SD}=128$, $N_{COL}=16$, $N_{ROW}=8 \times N_{BPSCS}$, and $N_{ROT}$ is a positive integer from 29 to 58 (including 29 and 58).

When the dual-carrier modulation mode is used, $N_{SD}$ is 63 or 64; and if $N_{SD}=63$, $N_{COL}=9$, $N_{ROW}=7 \times N_{BPSCS}$, and $N_{ROT}$ is a positive integer from 11 to 29; or if $N_{SD}=64$, $N_{COL}=16$, $N_{ROW}=4 \times N_{BPSCS}$, and $N_{ROT}$ is a positive integer from 11 to 29.

In a possible design, a tone mapping distance parameter $D_{TM}$ of the first tone demapper is a common divisor of $N_{SD}$, and $N_{SD}$ is a number of data subcarriers of the first tone demapper.

In a possible design, the method further includes: determining $D_{TM}$ in any one of the following manners.

Manner 1: A positive integer is selected from $[D_{TM\_min}, D_{TM\_max}]$ as $D_{TM}$, where $D_{TM\_min}$ is a tone mapping distance parameter corresponding to a second tone demapper corresponding to an RU in which a number of included data subcarriers is less than $N_{SD}$ and is the closest to $N_{SD}$, and $D_{TM\_max}$ is a tone mapping distance parameter corresponding to a third tone demapper corresponding to an RU in which a number of included data subcarriers is greater than $N_{SD}$ and is the closest to $N_{SD}$.

Manner 2: A positive integer that enables a PER of the receive end to be minimum or a positive integer that enables an SNR required when a PER of the receive end is a preset value to be minimum is selected from $[D_{TM\_min}, D_{TM\_max}]$ as $D_{TM}$.

Manner 3: A ratio $N_{SD}/N_{COL}$ of $N_{SD}$ to $N_{COL}$ of a first deinterleaver with a same RU size as the first tone demapper is used as $D_{TM}$.

In a possible design, the M RUs include one 26-tone RU and one 52-tone RU.

When a dual-carrier modulation mode is not used, $N_{SD}=72$, and $D_{TM}$ is 4 or 6.

When the dual-carrier modulation mode is used, $N_{SD}=36$, and $D_{TM}$ is 2 or 3.

In a possible design, the M RUs include one 26-tone RU and one 106-tone RU.

When a dual-carrier modulation mode is not used, $N_{SD}$ is 126 or 128; and if $N_{SD}=126$, $D_{TM}$ is 7 or 9; or if $N_{SD}=128$, $D_{TM}$ is 8.

When the dual-carrier modulation mode is used, $N_{SD}$ is 63 or 64; and if $N_{SD}=63$, $D_{TM}$ is 7 or 9; or if $N_{SD}=64$, $D_{TM}$ is 4 or 8.

In a possible design, the M RUs are M 242-tone RUs.

When M=2, $N_{SD}$ is 468 and $D_{TM}$ is 12 when a dual-carrier modulation mode is not used, and $N_{SD}$ is 234 and $D_{TM}$ is 9 when the dual-carrier modulation mode is used.

When M=3, $N_{SD}$ is 702 and $D_{TM}$ is 13 or 18 when a dual-carrier modulation mode is not used, and $N_{SD}$ is 351 and $D_{TM}$ is 9 or 13 when the dual-carrier modulation mode is used.

When M=4, $N_{SD}$ is 980 and $D_{TM}$ is 20 when a dual-carrier modulation mode is not used, and $N_{SD}$ is 490 and $D_{TM}$ is 14 when the dual-carrier modulation mode is used.

According to a fifth aspect, a data processing apparatus is provided in an embodiment of this application, and may be located at a transmit end. The apparatus includes a module/unit configured to perform the method according to the first aspect or any possible implementation of the first aspect.

For example, a sequential bit allocator is configured to allocate a coded bitstream of a first user to M RUs or a first RU including M RUs, where the M RUs or the first RU is an RU allocated to the first user, and M is a positive integer greater than 1.

A first interleaver or a first tone mapper is configured to reorder all bits in the coded bitstream.

According to a sixth aspect, a data processing apparatus is provided in an embodiment of this application, and may be located at a transmit end. The apparatus includes a module/unit configured to perform the method according to the second aspect or any possible implementation of the second aspect.

For example, a processor is configured to input all bits in a coded bitstream of a first user into a first interleaver or a first tone mapper, where M RUs or a first RU including M RUs is allocated to the first user, and M is a positive integer greater than 1.

The first interleaver or the first tone mapper is configured to reorder all bits in the coded bitstream.

According to a seventh aspect, a data processing apparatus is provided in an embodiment of this application, and may be located at a transmit end. The apparatus includes a module/unit configured to perform the method according to the third aspect or any possible implementation of the third aspect.

For example, a processor is configured to divide a total bandwidth of a first user into N sub-bandwidths, where at least one of the N sub-bandwidths includes a plurality of RUs.

A sequential bit allocator is configured to: allocate a coded bitstream of the first user to the N sub-bandwidths, and allocate a coded bitstream on a first sub-bandwidth to M RUs or a first RU including M RUs, where the first sub-bandwidth is any one of the at least one sub-bandwidth.

A first interleaver or a first tone mapper is configured to reorder all bits in all coded bitstreams on the first sub-bandwidth.

According to an eighth aspect, a data processing apparatus is provided in an embodiment of this application, and may be located at a receive end. The apparatus includes a module/unit configured to perform the method according to the fourth aspect or any possible implementation of the fourth aspect.

For example, a processor is configured to obtain a reordered bitstream of a first user from M RUs or a first RU including M RUs, where the M RUs or the first RU is an RU allocated to the first user, and M is a positive integer greater than 1.

A first deinterleaver or a first tone demapper is configured to restore a sequence of all bits in the reordered bitstream.

According to a ninth aspect, a data processing apparatus is provided in an embodiment of this application, includes a processor, and is configured to implement the method in the first aspect, the second aspect, the third aspect, or the fourth aspect.

Optionally, the apparatus may further include a memory, configured to store program instructions and data. The memory is coupled to the processor, and the processor may invoke and execute the program instructions stored in the memory, to implement the method in the first aspect, the second aspect, the third aspect, or the fourth aspect.

According to a tenth aspect, a computer-readable storage medium is provided in an embodiment of this application, the computer-readable storage medium stores a computer program, and the computer program includes program instructions. When the program instructions are executed by a computer, the computer is enabled to perform the method in the first aspect, the second aspect, the third aspect, or the fourth aspect.

According to an eleventh aspect, a computer program product is provided in an embodiment of this application, and the computer program product includes instructions. When the instructions are run on a computer, the computer is enabled to perform the method in the first aspect, the second aspect, the third aspect, or the fourth aspect.

According to a twelfth aspect, a communication system is provided in an embodiment of this application, and the communication system includes the data processing apparatus provided in the first aspect, the second aspect, or the third aspect and the data processing apparatus provided in the fourth aspect.

DESCRIPTION OF EMBODIMENTS

A key problem that needs to be resolved in modern wireless communication is how to further improve spectrum utilization and transmission reliability of a system. As a multi-carrier technology, in orthogonal frequency division multiplexing (OFDM), a channel is divided into several orthogonal sub-channels, a high-speed data signal is converted into parallel low-speed sub-data streams, and the parallel low-speed sub-data streams are modulated to each sub-channel for transmission. Carriers in OFDM are mutually orthogonal, each carrier has an integer number of subcarrier periods in one symbol time, and a zero point of a spectrum of each carrier overlaps a zero point of a neighboring carrier. In this way, inter-carrier interference is reduced. Because carriers partially overlap, frequency band utilization is improved compared with a conventional frequency division multiplexing technology, and performance of avoiding selective fading of frequency that is better than that in a conventional single-carrier system is provided. Based on the foregoing advantages, an OFDM technology is widely used in an existing wireless local area network (WLAN) standard (such as 802.11a/n/ac).

To further improve transmission reliability of the system on a fading channel, a system framework based on bit-interleaved coded modulation (BICM) is used in many wireless communication standards (such as HSPA/LTE, IEEE 802.11a/g/n/ac, or DVB-T2/S2/C2). To be specific, one channel encoder, one interleaver, and one memoryless constellation mapper are cascaded in series. On the fading channel, in a BICM system, cascaded interleavers are used to increase a channel coding gain, so that transmission reliability of the system is effectively improved.

In an existing WLAN standard, the OFDM technology and a BICM technology are combined to perform an interleaving operation on a coded bit sequence of the channel before OFDM modulation, to obtain a frequency domain coding diversity gain on a radio fading channel.

Figure 1:
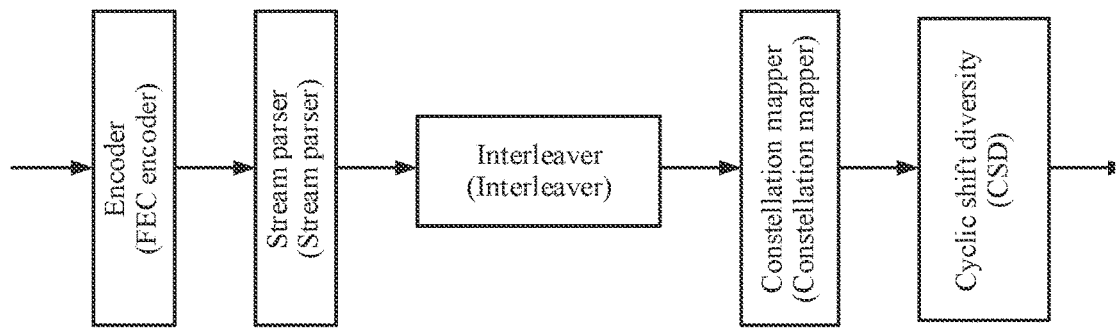
FIG. 1 is a block diagram of a partial architecture of a BICM system when BCC coding is used in a WLAN standard.

FIG. 1 is a block diagram of a partial architecture of a BICM system when binary convolutional code (BCC) coding is used in a WLAN standard. The partial architecture includes a forward error control (FCC) encoder, a stream parser, an interleaver, a constellation mapper, and a cyclic shift diversity (CSD) device that are sequentially cascaded in series.

The interleaver usually includes three parts (or three specific interleavers, where an interleaver 1, an interleaver 2, and an interleaver 3 are used below) that are cascaded in series. The interleaver 1 maps adjacent coded bits to non-adjacent OFDM subcarriers.

Figure 2:
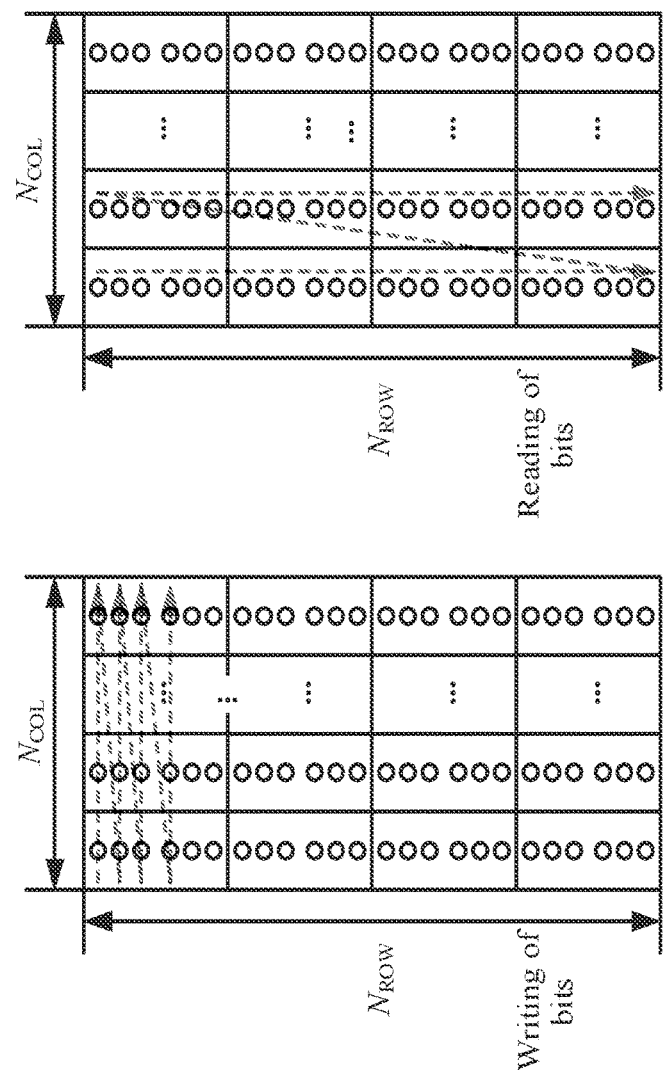
FIG. 2 is a diagram of a principle of an interleaver 1.

FIG. 2 is a diagram of an interleaving principle of a conventional row/column interleaver. The conventional row/column interleaver inputs data in a row form and reads the data in a column form. Parameters of the conventional row/column interleaver are $N_{COL}$ and $N_{ROW}$. $N_{ROW}$ is a number of rows, and $N_{COL}$ is a number of columns.

Bits before and after interleaving are respectively $x_k$ and $w_i$. In this case, an interleaving formula of the interleaver 1 is:

$$i = N_{ROW} \times (k \bmod N_{COL}) + \left\lfloor \frac{k}{N_{COL}} \right\rfloor \quad (1)$$

$$\left\lfloor \frac{k}{N_{COL}} \right\rfloor$$

represents rounding down $$\frac{k}{N_{COL}},$$

k mod $N_{COL}$ represents a remainder obtained after dividing k by $N_{COL}$, k is an identifier of a location of an uninterleaved bit in a bitstream, and i is an identifier of a location of an interleaved bit in the bitstream. k=0, 1, . . . , $N_{CBPSS}(i_{SS})$−1, where $i_{SS}$ is a sequence number of a current spatial data stream, and $N_{CBPSS}$ is a total number of bits of a bitstream that is currently input into the interleaver (or a total number of bits of a bitstream that is currently processed by the interleaver).

The interleaver 2 alternately maps adjacent coded bits to a least significant bit (LSB) and a most significant bit (MSB) in a constellation diagram, to avoid a case in which coded bits are continuously mapped to the least significant bit.

m=$\log_2$ M is a constellation modulation order (M is a quadrature amplitude modulation (QAM) scheme, for example, when a modulation scheme is 64 QAM, m=$\log_2$ 64=6), and bits before and after interleaving are respectively $y_j$ and $w_k$. In this case, an interleaving formula of the interleaver 2 is:

$$j = s \cdot \left\lfloor \frac{k}{s} \right\rfloor + \left(k + N_{CBPSS} - \left\lfloor \frac{N_{COL} \cdot k}{N_{CBPSS}} \right\rfloor \right) \bmod s \quad (2)$$

s=max{1, m/2}, $N_{CBPSS}$ is a number of coded bits of each symbol in each spatial data stream, k is an identifier of a location of an uninterleaved bit in a bitstream, and j is an identifier of a location of an interleaved bit in the bitstream.

Figure 3:
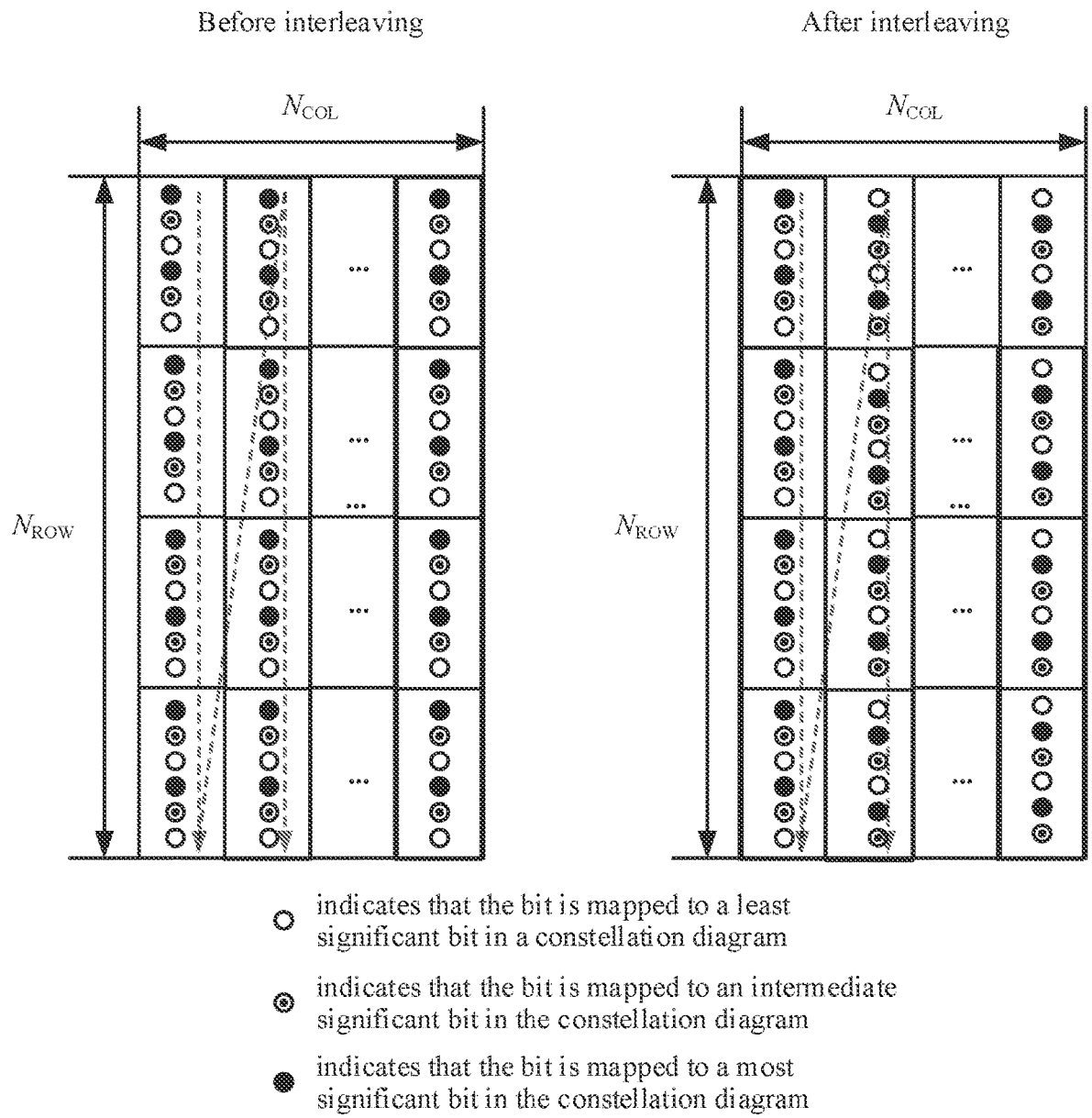
FIG. 3 is a diagram of a principle of an interleaver 2.

As shown in FIG. 3, before the interleaver 2 performs interleaving, coded bits in a first column are mapped to most significant bits, coded bits in a second column are mapped to intermediate significant bits, and coded bits in a third column are mapped to least significant bits; and therefore, adjacent coded bits are continuously mapped to relatively low and relatively high significant bits in the constellation diagram. After the interleaver 2 performs interleaving, adjacent coded bits in each column are alternately mapped to the relatively low and relatively high significant bits in the constellation diagram, to avoid long-time running of a low-reliability (LSB) bit.

It should be understood that input of the interleaver 2 is actually output of the interleaver 1. Therefore, uninterleaved bits in the interleaver 2 herein correspond to interleaved bits of the interleaver 1; in other words, k in the interleaver 2 is not equivalent to k in the interleaver 1, and k in the interleaver 2 actually needs to be equivalent to i in the interleaver 1.

Interleaver 3: If there is more than one spatial data stream, there is the interleaver 3. The interleaver performs a frequency domain rotation operation on an additional spatial data stream. A parameter of the interleaver 3 is $N_{ROT}$, and indicates frequency rotation of a current spatial data stream.

Bits before and after interleaving are respectively $z_r$ and $y_k$. In this case, an interleaving formula of the interleaver 3 is:

$$r = \left(k + \left(((i_{SS} - 1) \cdot 2)\mod 3 + 3 \cdot \left[\frac{i_{SS} - 1}{3}\right]\right) \cdot N_{ROT} \cdot m\right) \mod N_{CBPSS} \quad (3)$$

$i_{SS}$ represents a sequence number of the current spatial data stream, and r is an identifier of a location of an interleaved bit in a bitstream. It should be understood that input of the interleaver 3 is actually output of the interleaver 2. Therefore, uninterleaved bits in the interleaver 3 herein correspond to interleaved bits of the interleaver 2; in other words, k in the interleaver 3 is not equivalent to k in the interleaver 2 or the interleaver 1, and k in the interleaver 3 actually needs to be equivalent to j in the interleaver 2.

To further improve transmission efficiency of a multi-user system, an orthogonal frequency division multiple access (OFDMA) technology is introduced in an 802.11ax standard. In OFDMA, a transmission bandwidth is divided into a series of orthogonal and non-overlapping subcarrier sets, and different subcarrier sets are allocated to different users to implement multiple access. Compared with the OFDM technology, in an OFDMA system, an available bandwidth resource can be dynamically allocated to a user with a requirement, so that it is easy to optimize use of system resources. Different subcarrier sets in each OFDM symbol are allocated to different users.

A 26-tone resource unit (26-tone RU), a 52-tone RU, a 106-tone RU, a 242-tone RU, a 484-tone RU, a 996-tone RU, and a 2×996-tone RU are defined in 802.11ax. In addition, each user is required to receive or send data in only one RU. In addition, the interleaver performs an operation in one RU; in other words, for bits in different RUs, different interleavers need to be used for interleaving. In this way, for each user, procedures of the interleaver 1, the interleaver 2, and the interleaver 3 may still be used.

Figure 4:
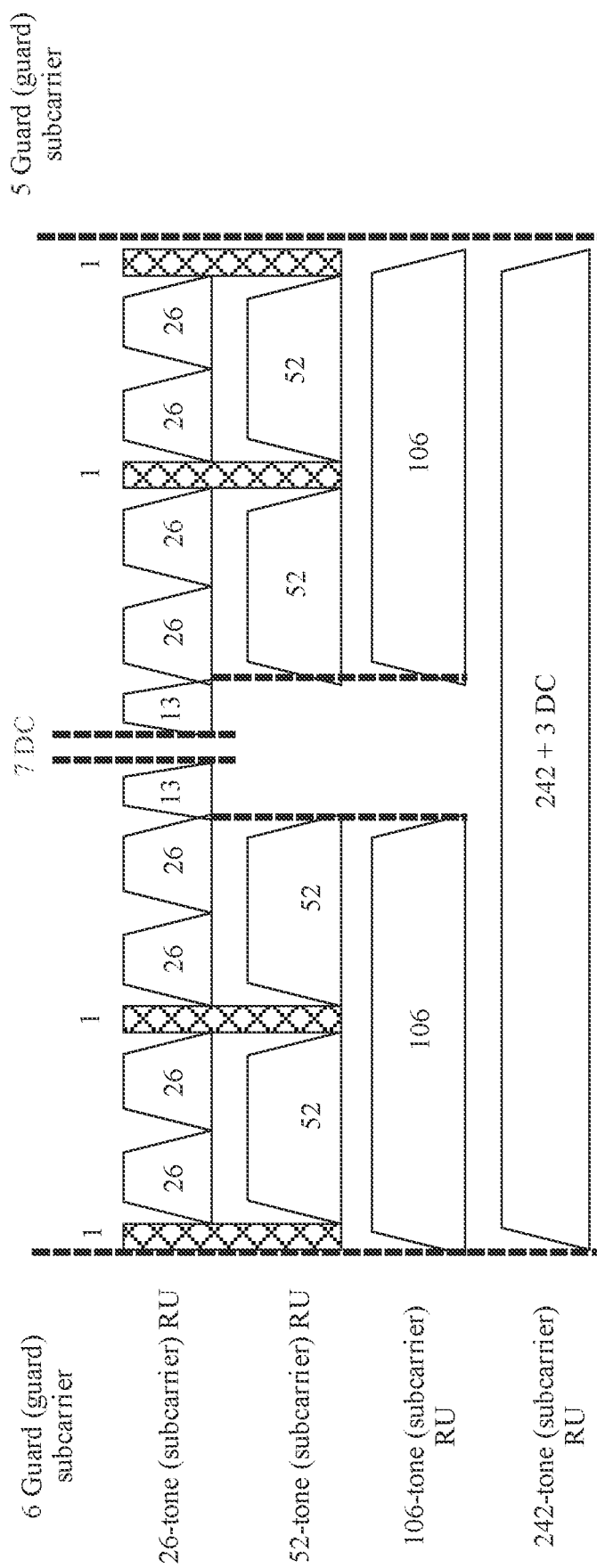
FIG. 4 is a diagram of resource unit division of a 20 MHz bandwidth.
Figure 5:
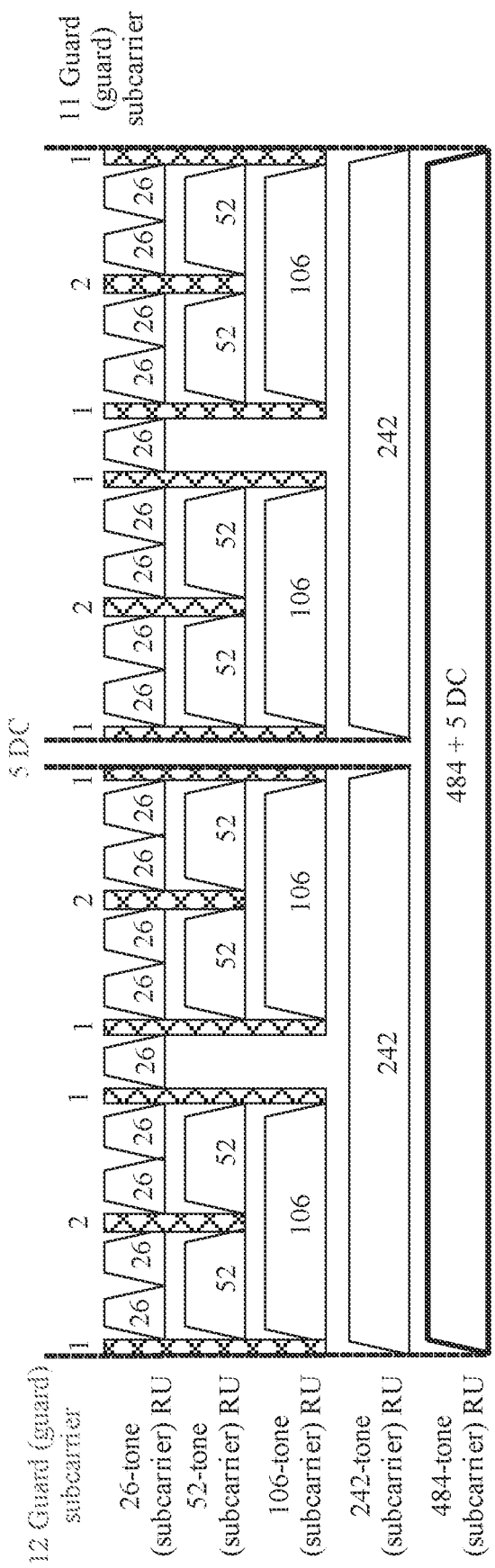
FIG. 5 is a diagram of resource unit division of a 40 MHz bandwidth.
Figure 6:
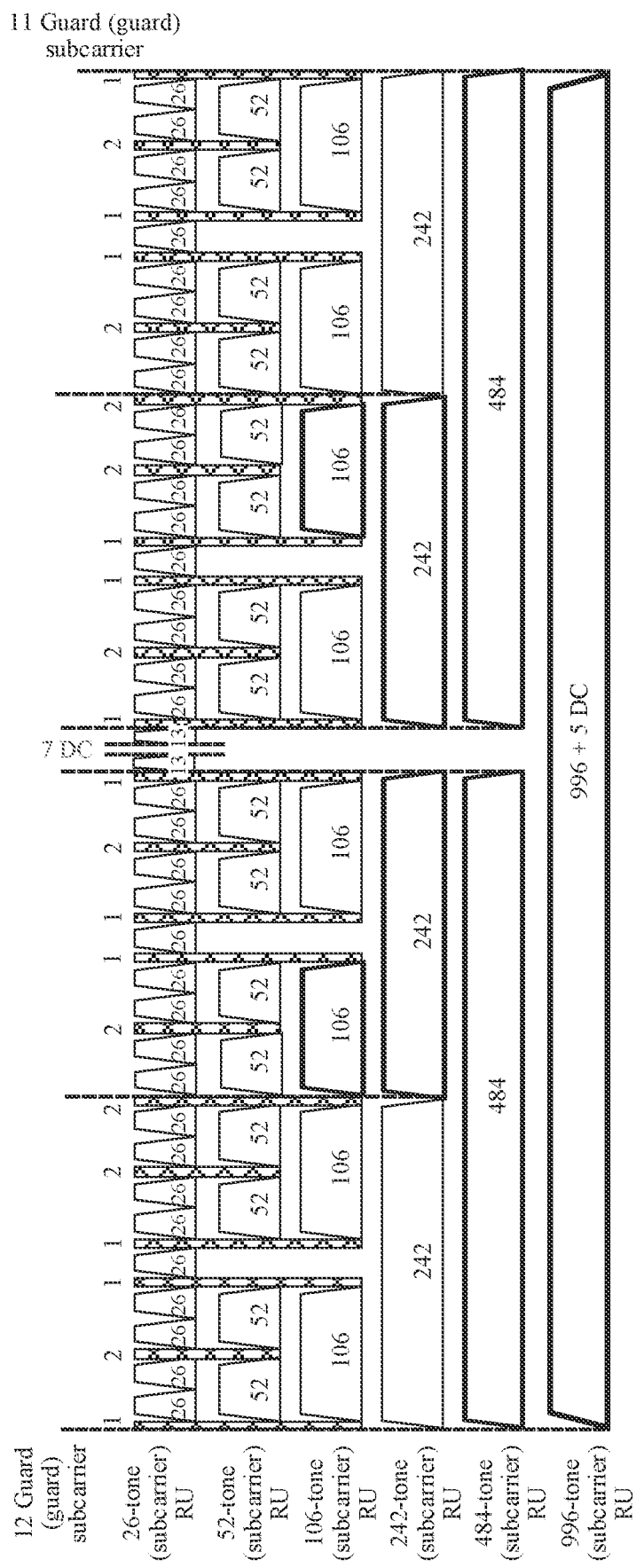
FIG. 6 is a diagram of resource unit division of an 80 MHz bandwidth.

FIG. 4, FIG. 5, and FIG. 6 are diagrams of resource unit division of a 20 MHz bandwidth, a 40 MHz bandwidth, and an 80 MHz bandwidth that are defined in 802.11ax.

Refer to FIG. 4. When a bandwidth is 20 MHz, the entire bandwidth may include an entire 242-tone RU, or may include various combinations of a 26-tone RU, a 52-tone RU, and a 106-tone RU. In addition to an RU used to transmit data, some guard subcarriers, null subcarriers, direct current (DC) subcarriers, and the like are included.

Refer to FIG. 5. When a bandwidth is 40 MHz, the entire bandwidth is approximately equivalent to replication of distribution of a 20 MHz subcarrier, and the entire bandwidth may include an entire 484-tone RU, or may include various combinations of a 26-tone RU, a 52-tone RU, a 106-tone RU, and a 242-tone RU.

Refer to FIG. 6. When a bandwidth is 80 MHz, the entire bandwidth includes four resource units in units of 242-tone RUs. Specifically, in the middle of the entire bandwidth, there is another intermediate 26-tone RU including two 13-tone subunits. The entire bandwidth may include an entire 996-tone RU, or may include various combinations of a 26-tone RU, a 52-tone RU, a 106-tone RU, a 242-tone RU, and a 484-tone RU.

When the bandwidth is 160 MHz or 80+80 MHz, the entire bandwidth may be considered as replication of distribution of two 80 MHz subcarriers. The entire bandwidth may include an entire 2×996-tone RU, or may include various combinations of a 26-tone RU, a 52-tone RU, a 106-tone RU, a 242-tone RU, a 484-tone RU, and a 996-tone RU. No diagram examples are provided one by one herein.

In a next-generation WLAN standard 802.11be, a case in which a plurality of RUs are allocated to one user may be supported for an OFDMA system. However, there is no specific solution in a conventional technology to how to design an interleaver or an LDPC tone mapper for a user to whom a plurality of RUs are allocated.

Figure 7:
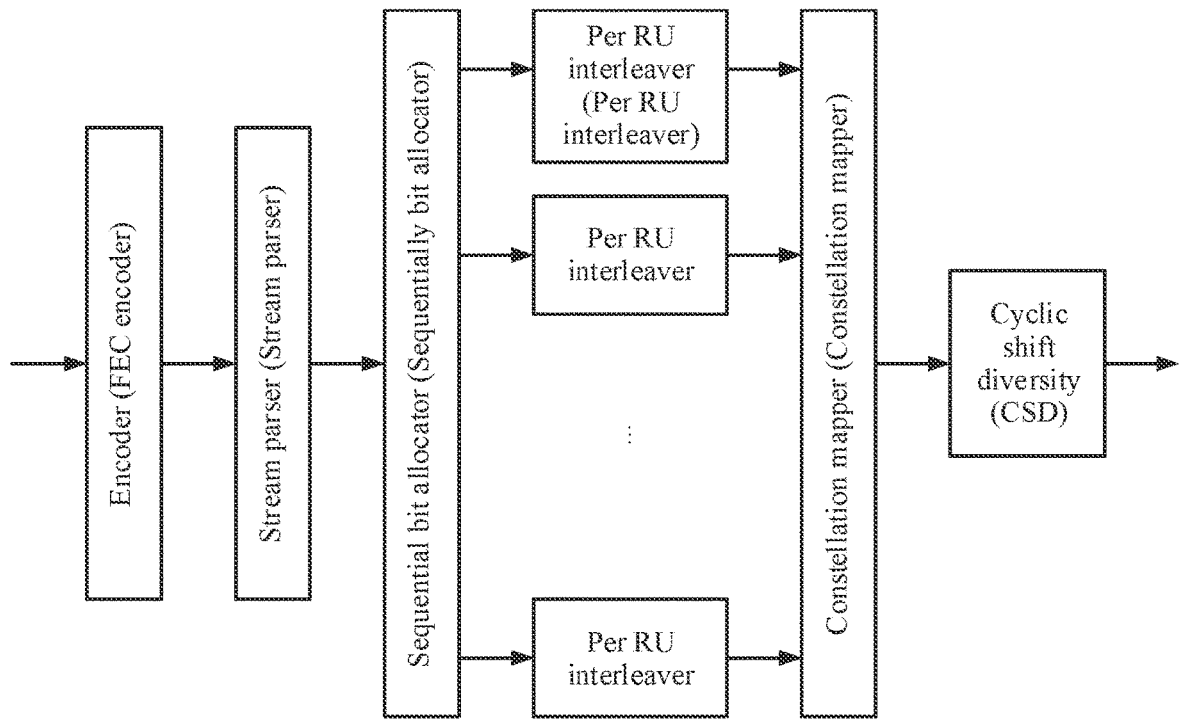
FIG. 7 is a schematic flowchart of a data processing method according to an embodiment of this application.

Therefore, a data processing method is provided in an embodiment of this application. As shown in FIG. 7, if n RUs are allocated to a same user, where n is greater than 1, an interleaving module may be divided into two levels of processing units. A first level of processing unit alternately allocates data bits to different RUs of a single user by using a sequential bit allocator, and a second level of processing unit interleave bits in each RU by using a conventional interleaver (generally including an interleaver 1 and an interleaver 2 in a conventional WLAN standard). In this solution, the second level of processing unit only needs to design an interleaver for a size of an RU block, and therefore implementation is relatively simple. However, the user needs to support a plurality of RU interleavers in parallel; in other words, a corresponding interleaver needs to be separately designed for each RU. Consequently, hardware costs are increased.

Figure 8:
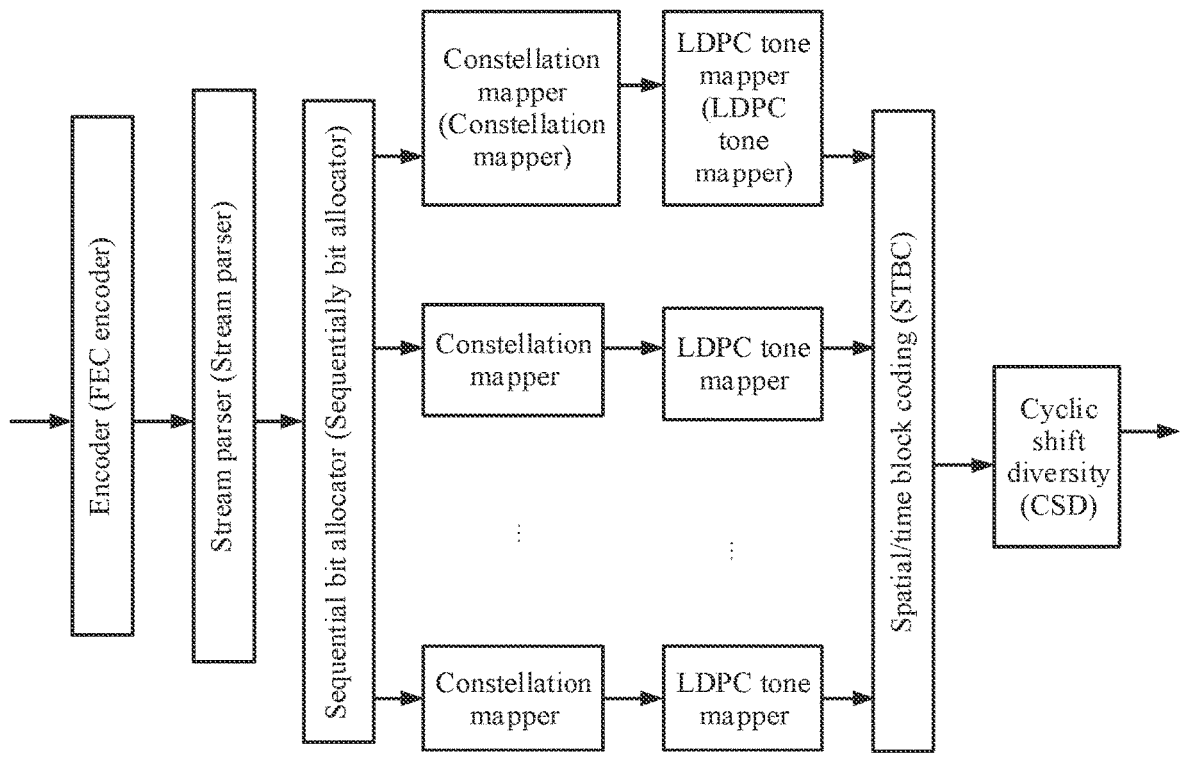
FIG. 8 is a schematic flowchart of a data processing method according to an embodiment of this application.

The foregoing interleaver mainly interleaves bits of BCC coding. However, for another coding technology in an 802.11 system: low-density parity check code (LDPC) coding, as shown in FIG. 8, another data processing method is provided in an embodiment of this application. After constellation mapping is performed, bits are scrambled by using an LDPC tone mapper, and an interleaving effect equivalent to that of a row/column interleaver in BCC can be achieved (in other words, bits are reordered). In an LDPC coding manner, if a plurality of RUs are allocated to a user, the user also needs to support a plurality of LDPC tone mappers in parallel; in other words, a corresponding LDPC tone mapper needs to be separately designed for each RU, but a problem of high hardware costs still exists.

Therefore, a data processing method is further provided in an embodiment of this application, to scramble, with low costs, a bit sequence of a bitstream of a user to whom a plurality of RUs are allocated. Specifically, when a plurality of RUs are allocated to a same user (for example, a first user) or a large RU (or a new RU) including a plurality of RUs is allocated to a same user, a unified interleaver with new parameters is designed to uniformly interleave all bits in the plurality of RUs of the user, or a unified LDPC tone mapper with new parameters is designed to uniformly scramble all bits in the plurality of RUs of the user. In this way, for bit data of the user, it may not be required to design a large number of RU interleavers or LDPC tone mappers in parallel, so that hardware costs can be effectively reduced.

Technical solutions in embodiments of this application may be applied to various communication systems, for example, a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a 5th generation (5G) system such as NR, and a future communication system such as a 6G system. Certainly, the technical solutions in embodiments of this application may also be applied to another communication system, provided that data is received and/or sent in the communication system.

The technical solutions in embodiments of this application may be further applicable to a wireless local area network (WLAN) scenario, may be applicable to an IEEE 802.11 system standard (such as an IEEE 802.11a/n/ac standard), a next-generation WLAN standard (such as 802.11be), or a further next-generation standard, and may be applicable to a wireless local area network system including but not limited to an internet of things (IOT) network or a vehicle-to-everything (Vehicle to X, V2X) network.

Figure 9:
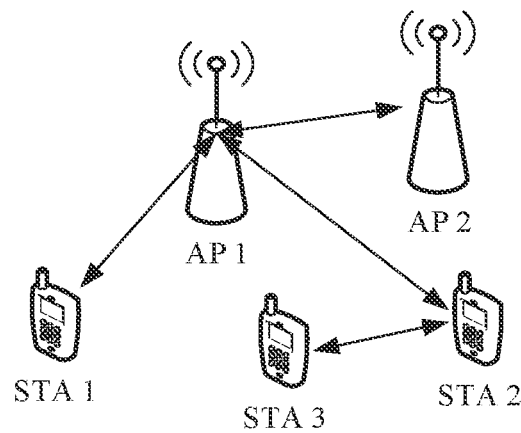
FIG. 9 is a schematic diagram of a network architecture of a WLAN to which an embodiment of this application is applicable.

For example, FIG. 9 is a schematic diagram of a network architecture of a WLAN to which an embodiment of this application is applicable. Devices in this communication system include an access point (AP) and a station (STA). A type of communication in the communication system includes data communication between one or more wireless access points (AP) and one or more stations (STA), data communication between one or more APs and one or more APs, data communication between one or more STAs and one or more STAs, and the like.

In the communication system, any AP may schedule a radio resource for a STA associated with and/or not associated with the any AP, and transmit data to the STA on the scheduled radio resource. A data transmission type includes uplink transmission and/or downlink transmission. For example, an AP 1 in FIG. 9 may schedule radio resources for a STA 1 and a STA 2. For ease of description, only two APs and three STAs are shown in FIG. 9. However, it should be understood that the WLAN system may further include more or fewer APs and more or fewer STAs. In addition, the APs may communicate with each other by using a distributed system (DS). Further, the STAs may also communicate with each other. This is not specifically limited in this embodiment of this application.

The STA involved in this application may be any user terminal, user apparatus, access apparatus, subscriber station, subscriber unit, mobile station, user agent, user equipment, or another name that has a wireless communication function. The user terminal may include various handheld devices, vehicle-mounted devices, wearable devices, computing devices, or other processing devices connected to a wireless modem that have a wireless communication function, and various forms of user equipment (UE), mobile stations (MS), terminals, terminal equipment, portable communication devices, handheld devices, portable computing devices, entertainment devices, game devices or systems, global positioning system devices, or any other suitable devices configured to perform network communication by using a wireless medium. Herein, for ease of description, the devices mentioned above are collectively referred to as a station or a STA.

The AP involved in this application is an apparatus deployed in a wireless communication network to provide a wireless communication function for a STA associated with the AP. The AP may be used as a hub of the communication system, and may be a communication device such as a base station, a router, a gateway, a relay, a communication server, a switch, or a bridge. The base station may include various forms of macro base stations, micro base stations, and relay stations. Herein, for ease of description, the devices mentioned above are collectively referred to as an access point or an AP.

To make the objectives, technical solutions, and advantages of this application clearer, embodiments of this application are specifically described below with reference to the accompanying drawings of this specification. It should be noted that terms used in embodiments of this application are only used to explain specific embodiments of this application, but are not intended to limit this application.

It should be understood that, in the following descriptions, "and/or" describes an association relationship of associated objects, and represents that there may be three relationships. For example, A and/or B may represent three cases: only A exists, both A and B exist, and only B exists. The character "/" generally indicates an "or" relationship between the associated objects.

"At least one" involved in this application means one or more, and "a plurality of" means two or more. Words such as "first" and "second" are merely used for distinguishing purposes, and cannot be understood as an indication or implication of relative importance, and cannot be understood as an indication or implication of a sequence. In this application, an explanation of a symbol, a parameter, a label, a term, or the like may be applied to an entire application document.

Figure 10:
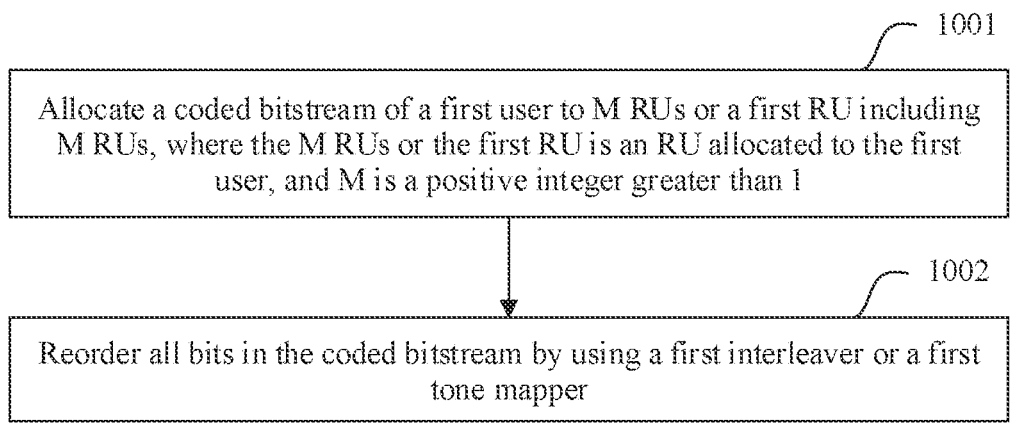
FIG. 10 is a flowchart of a data processing method according to an embodiment of this application.

FIG. 10 is a flowchart of a data processing method according to an embodiment of this application. The method may be applied to the WLAN system shown in FIG. 9.

S1001: A transmit end allocates a coded bitstream of a first user to M RUs or a first RU including M RUs, where the M RUs or the first RU is an RU allocated to the first user, and M is a positive integer greater than 1.

The transmit end may be a STA in a WLAN system, or may be an AP. This is not limited herein. The RU herein includes but is not limited to the 26-tone RU, the 52-tone RU, the 106-tone RU, the 242-tone RU, the 484-tone RU, the 996-tone RU, the 2×996-tone RU, and the like in the foregoing descriptions.

In this embodiment of this application, there may be the following two understandings for the RU allocated to the first user.

In a first understanding, the M RUs are allocated to the first user, and M is a positive integer greater than 1. It should be noted that the M RUs may be continuous or discontinuous in a spectrum bandwidth. This is not limited herein. In addition, types of the M RUs (or sizes of the RUs) may be the same or different. This is not limited herein. For example, the M RUs may be one 26-tone RU and one 52-tone RU, one 26-tone RU and one 106-tone RU, two 242-tone RUs, twelve 242-tone RUs, or the like.

In a second understanding, the RU allocated to the first user is the first RU (or a large RU or a new RU) including (or combining) M RUs, and M is a positive integer greater than 1. For example, the first RU may be a 78-tone RU including one 26-tone RU and one 52-tone RU, a 132-tone RU including one 26-tone RU and one 106-tone RU, a 484-tone RU including two 242-tone RUs, or a 2904-tone RU including twelve 242-tone RUs.

It should be noted that the M RUs and the first RU in the foregoing two understandings essentially represent resources (or resources of a same size) in a same location in the spectrum bandwidth. In other words, in this embodiment of this application, "M RUs" and "first RU" may be replaced with each other.

S1002: The transmit end reorders all bits in the coded bitstream by using a first interleaver or a first tone mapper.

For different coding manners, different solutions for reordering bits may be used. For example, if a coding manner of the bitstream is BCC, the transmit end reorders all the bits in the coded bitstream by using the first interleaver. It should be understood that the first interleaver herein is an interleaver with new parameters that is designed for the M RUs. If a coding manner of the bitstream is LDPC, the transmit end reorders all the bits in the coded bitstream by using the first tone mapper. It should be understood that the first tone mapper herein is a tone mapper with new parameters that is designed for the M RUs.

In a possible implementation, in specific implementation of step S1001, a specific manner in which the transmit end allocates the coded bitstream of the first user to the M RUs may be as follows:

Manner 1: The transmit end sequentially and alternately allocates, to the M RUs in a bit sequence, bits that are output by a stream parser.

For example, it is assumed that the M RUs are one 26-tone RU (including 24 data subcarriers, and assuming that data of 24 bits can be carried) and one 52-tone RU (including 48 data subcarriers, and assuming that data of 48 bits can be carried), and the coded bitstream has a total of 72 bits. In this case, the transmit end may first allocate a first bit to a $24^{th}$ bit in the bitstream (data of a total of 72 bits) to the 26-tone RU in the bit sequence, and then allocate a $25^{th}$ bit to a $72^{nd}$ bit in the bitstream to the 52-tone RU. It should be noted that in actual application, a total number of bits of the bitstream may alternatively be less than or greater than a number of bits that can be carried by the M RUs. If the total number of bits of the bitstream is less than the number of bits that can be carried by the M RUs, for example, is 70 bits, the bitstream needs to be padded; in other words, the bitstream is interleaved after being supplemented to 72 bits. If the total number of bits of the bitstream is greater than the number of bits that can be carried by the M RUs, interleaving is performed in units of symbols. For example, if the total number of bits of the bitstream is 144 bits, an interleaving operation needs to be performed on the bitstream twice, and 72 bits are interleaved each time.

Figure 11A:
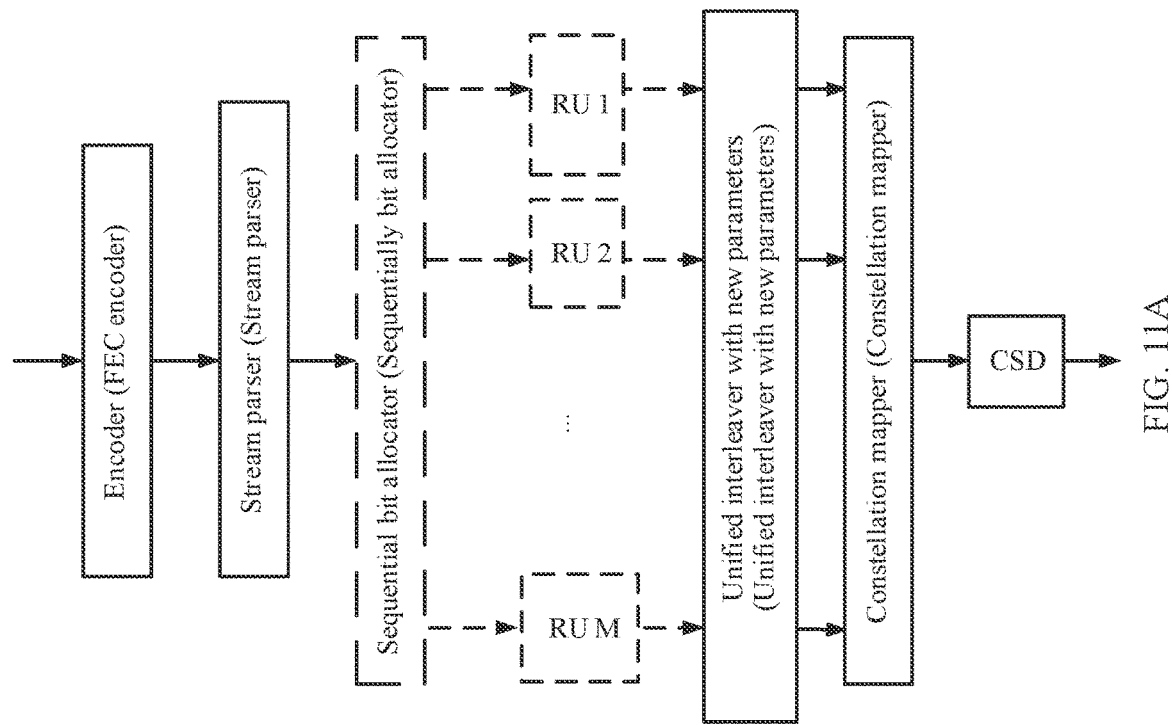
FIG. 11A to FIG. 11F are schematic diagrams of allocating a coded data stream to M RUs.

The first interleaver is used as an example. As shown in FIG. 11A, after performing channel coding on the bits by using an encoder, the transmit end performs, by using the stream parser, stream parsing on a coded bitstream that is output by the encoder (in other words, allocates the bitstream to different spatial streams), and then sequentially and alternately allocates, to the M RUs in a bit sequence by using a sequential bit allocator, bits that are output by the stream parser, and finally uniformly inputs the bits allocated to the M RUs into a unified interleaver (that is, the first interleaver) with new parameters and reorders the bit sequence.

Figure 11B:
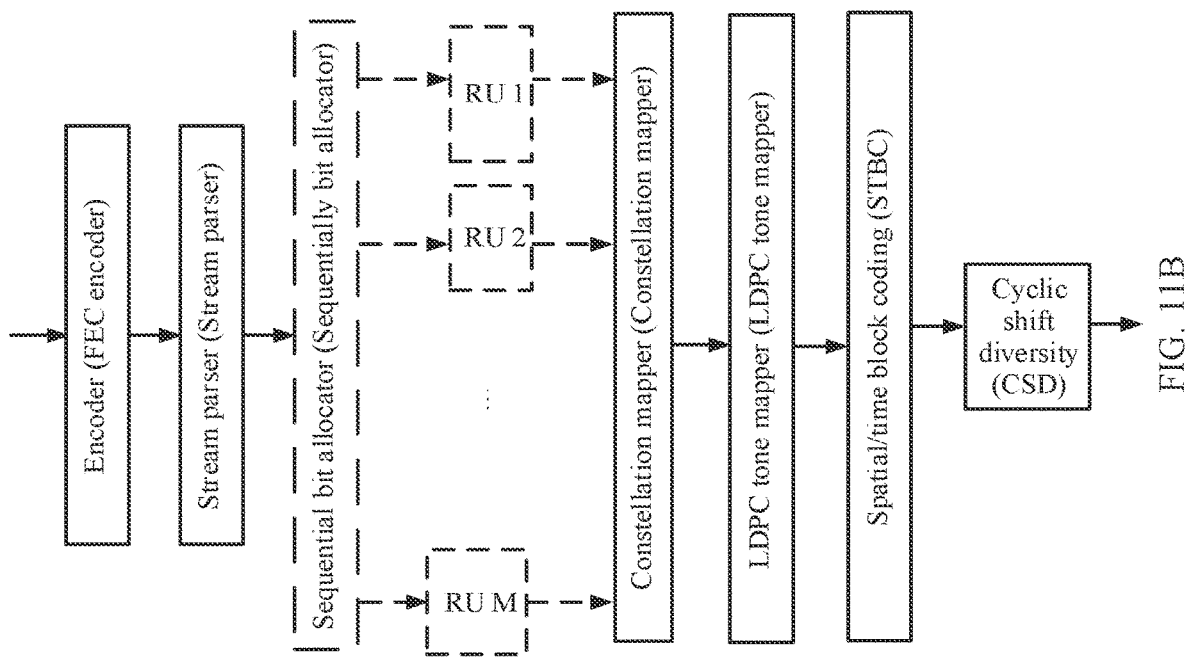

The first tone mapper is used as an example. As shown in FIG. 11B, after performing channel coding on the bits by using an encoder, the transmit end performs, by using the stream parser, stream parsing on a coded bitstream that is output by the encoder, and then sequentially and alternately allocates, to the M RUs in a bit sequence by using a sequential bit allocator, bits that are output by the stream parser, and then uniformly inputs the bits allocated to the M RUs into a unified tone mapper (that is, the first tone mapper) with new parameters and reorders the bit sequence, and then performs operations such as constellation mapping, spatial/time block coding, and CSD.

Figure 11C:
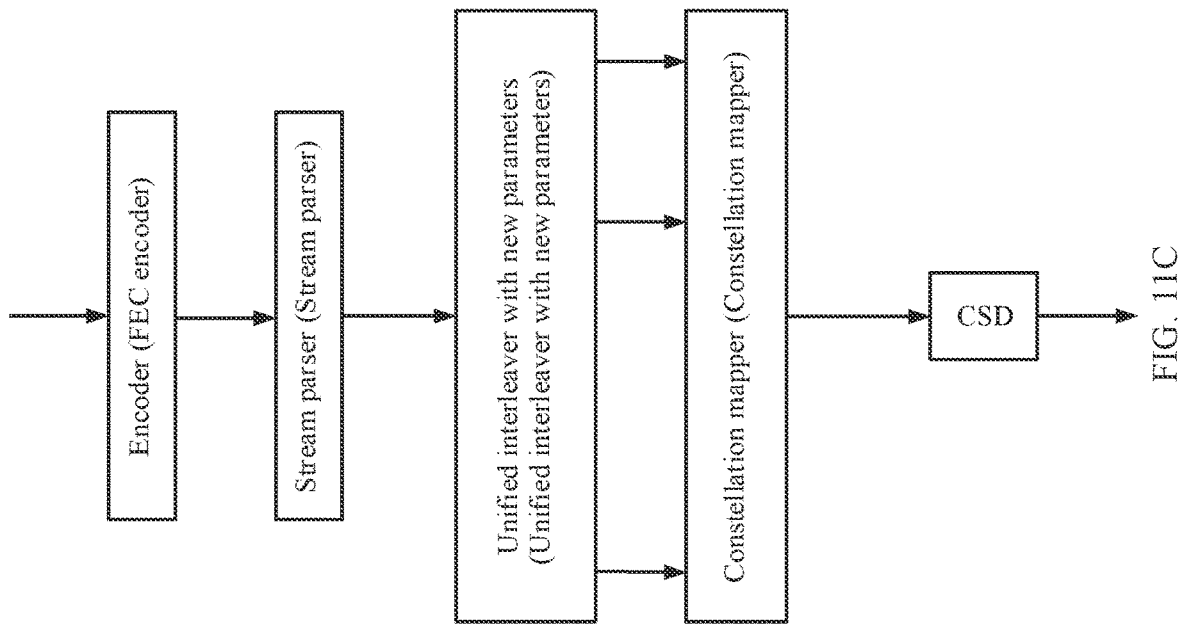
Figure 11D:
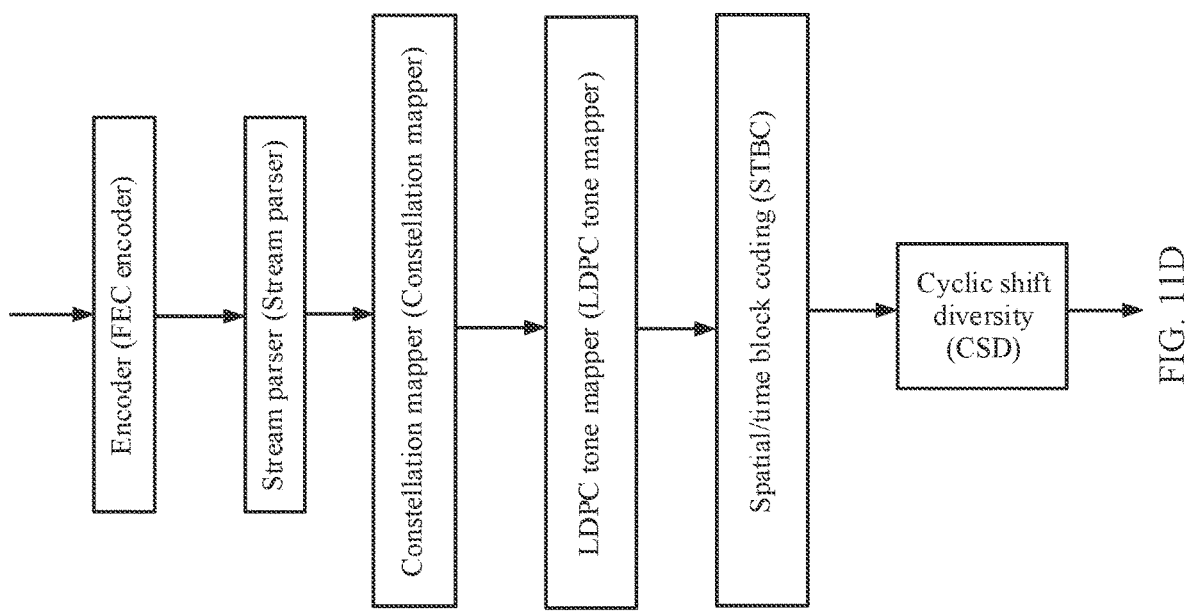

It should be understood that in this allocation manner, because all bits in the coded bitstream sequentially enter a same interleaver or tone mapper in sequence, it may also be considered that the transmit end does not have a process of allocating the coded bitstream to the M RUs, but directly inputs the coded bitstream into the first interleaver or the first tone mapper in sequence. Therefore, a dashed-line part in FIG. 11A may not be drawn, as shown in FIG. 11C. Similarly, a dashed-line part in FIG. 11B may not be drawn, as shown in FIG. 11D.

Therefore, in this allocation manner, step S1001 may alternatively be replaced with the following: inputting all bits in a coded bitstream of a first user into a first interleaver or a first tone mapper, where M RUs or a first RU including M RUs is allocated to the first user, and M is a positive integer greater than 1.

In another possible implementation, in specific implementation of step S1001, a specific manner in which the transmit end allocates the coded bitstream of the first user to the M RUs may be as follows:

Manner 2: The transmit end alternately allocates, to each of the M RUs based on a preset rule by using a sequential bit allocator, bits that are output by the stream parser, and then uniformly interleaves all the allocated bits by using the first interleaver.

For example, assuming that the bitstream has a total of 72 bits, and the M RUs are one 26-tone RU (including 24 data subcarriers, and assuming that data of 24 bits can be carried) and one 52-tone RU (including 48 data subcarriers, and assuming that data of 48 bits can be carried), the transmit end may allocate the bits in the bitstream to the 26-tone RU and the 52-tone RU based on a preset rule by using a bit allocator. For example, the bits in the bitstream are sequentially and alternately allocated to the 26-tone RU and the 52-tone RU in a bit sequence: A first bit is allocated to the 26-tone RU, a second bit is allocated to the 52-tone RU, a third bit is allocated to the 26-tone RU, a fourth bit is allocated to the 52-tone RU, a fifth bit is allocated to the 26-tone RU, a sixth bit is allocated to the 52-tone RU, . . . , and so on. For another example, the bits are alternately allocated to the 26-tone RU and the 52-tone RU based on a size ratio of the RUs: A first bit is allocated to the 26-tone RU, a second bit and a third bit are allocated to the 52-tone RU, a fourth bit is allocated to the 26-tone RU, a fifth bit and a sixth bit are allocated to the 52-tone RU, . . . , and so on.

It should be understood that the manner 1 may also be understood as a special example of the manner 2.

Figures 11E, 11F:
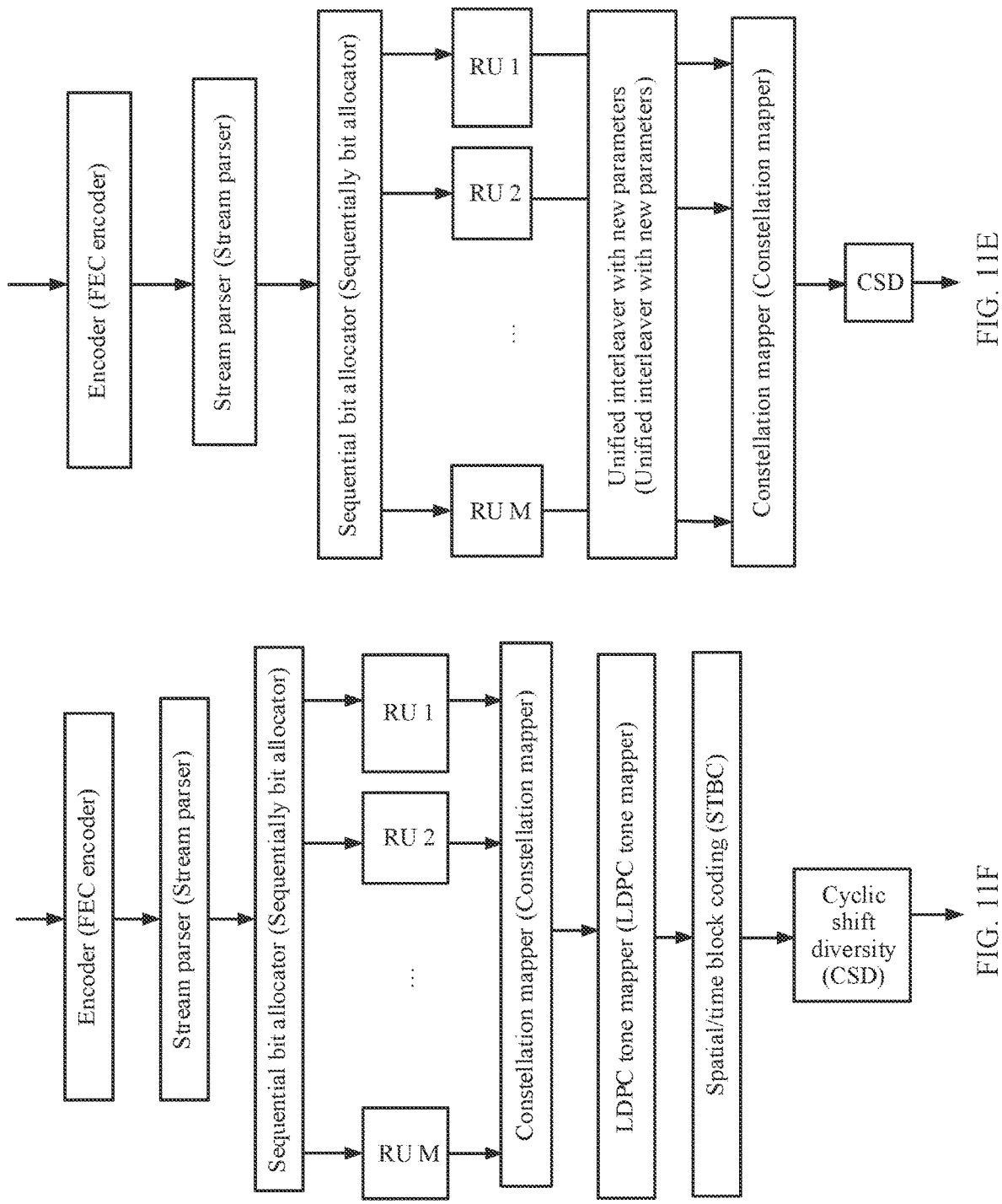

The first interleaver is used as an example. As shown in FIG. 11E, after performing channel coding on the bits by using an encoder, the transmit end performs, by using the stream parser, stream parsing on a coded bitstream that is output by the encoder (in other words, allocates the bitstream to different spatial streams), and then allocates, to the M RUs based on a preset rule by using a sequential bit allocator, bits that are output by the stream parser, and finally uniformly inputs the bits allocated to the M RUs into a unified interleaver (that is, the first interleaver) with new parameters and reorders the bit sequence.

The first tone mapper is used as an example. As shown in FIG. 11F, after performing channel coding on the bits by using an encoder, the transmit end performs, by using the stream parser, stream parsing on a coded bitstream that is output by the encoder, and then allocates, to the M RUs based on a preset rule by using a sequential bit allocator, bits that are output by the stream parser, and then uniformly inputs the bits allocated to the M RUs into a unified tone mapper (that is, the first tone mapper) with new parameters and reorders the bit sequence, and then performs operations such as constellation mapping, spatial/time block coding, and CSD.

In this embodiment of this application, when a plurality of RUs (or a first RU including a plurality of RUs) are allocated to the first user, all bits in the plurality of RUs (or the first RU) of the user are reordered by using an interleaver with new parameters or an LDPC tone mapper with new parameters (Unified LDPC tone mapper with new parameters), and coded bits of the user with the plurality of RUs can be reordered without a need to support a plurality of RU interleavers or a plurality of LDPC tone mappers in parallel. In this way, hardware costs can be effectively reduced.

Methods for designing parameters of the first interleaver and the first tone mapper are described in detail below by using several specific embodiments.

Embodiment 1

Design of a parameter of the first interleaver is mainly described in Embodiment 1.

For an interleaving process of the first interleaver, procedures of the interleaver 1, the interleaver 2, and the interleaver 3 mentioned above may be reused. However, because a total size of the M RUs (or a size of the first RU) is different from that of an existing RU, corresponding parameters need to be redesigned based on the M RUs (or the first RU).

(1) Determine a number $N_{SD}$ of data subcarriers of the first interleaver (that is, a number $N_{SD}$ of data subcarriers of the first RU).

Specifically, one RU includes a data subcarrier and a pilot subcarrier. The pilot subcarrier is used for phase tracking, to reduce impact exerted by a phase difference and a frequency difference on receive performance. The data subcarrier is used to carry data, and a part that needs to be interleaved is also a data subcarrier. Therefore, design of a data subcarrier of the first interleaver depends on a number of data subcarriers in the M RUs.

For example, an RU 26 (an abbreviation of a 26-tone-RU) includes 24 data subcarriers ($N_{SD}$=24) and two pilot subcarriers, and an RU 52 (an abbreviation of a 52-tone-RU) includes 48 data subcarriers and four pilot subcarriers. Therefore, an RU 78 (an abbreviation of a 78-tone-RU) obtained after combining the RU 26 and the RU 52 includes 72 data subcarriers and six pilot subcarriers.

For example, an RU 26 includes 24 data subcarriers and two pilot subcarriers, and an RU 106 (an abbreviation of a 106-tone-RU) includes 102 data subcarriers and four pilot subcarriers. Therefore, an RU 132 (an abbreviation of a 132-tone-RU) obtained after combining the RU 26 and the RU 106 includes 126 data subcarriers and six pilot subcarriers.

In some possible designs, to further improve data transmission efficiency, for a new RU obtained after combination, an original pilot subcarrier may also be used as a data subcarrier. For example, for a case in which RU 132=RU 106+RU 26, all subcarriers in the RU 26 may be used as data subcarriers. Therefore, the RU 132 obtained after combining the RU 106 and the RU 26 includes 128 data subcarriers and four pilot subcarriers.

Therefore, in this embodiment of this application, a value of $N_{SD}$ of the first interleaver may be summarized as any positive integer in $[N_{SD\_min}, N_{SD\_max}]$, where $N_{SD\_min}$ is a sum of numbers of data subcarriers included in all the M RUs, and $N_{SD\_max}$ is a sum of numbers of subcarriers included in all the M RUs.

It should be understood that $[N_{SD\_min}, N_{SD\_max}]$ in this application represents a closed interval; in other words, a minimum value of $N_{SD}$ of the first interleaver may be $N_{SD\_min}$, and a maximum value may be $N_{SD\_max}$.

A value of the data subcarrier of the first interleaver in a case in which dual-carrier modulation (DCM) is not used is described above. If DCM is used, it indicates that a same data bit is to be mapped to two subcarriers, and this is equivalent to half of data subcarriers that can be carried by the first RU. For example, $N_{SD}$ of an RU 78 changes to 36.

Therefore, in this embodiment of this application, if whether to use DCM is further considered, $N_{SD}$ of the first interleaver may be summarized as any positive integer in $[N_{SD\_min}/Q, N_{SD\_max}/Q]$, where $N_{SD\_min}$ is a sum of numbers of data subcarriers included in all the M RUs, $N_{SD\_max}$ is a sum of numbers of subcarriers included in all the M RUs, and Q is a number of data subcarriers to which one data bit is mapped.

A value of Q may also be understood as a modulation mode of a carrier. For example, when a dual-carrier modulation mode is used, one data bit is to be mapped to two data subcarriers, and Q=2. When the dual-carrier modulation mode is not used, one data bit is to be mapped to one data subcarrier, and Q=1.

It should be noted that, based on a current WLAN standard, when the dual-carrier modulation mode is not used, it is considered by default that one data bit is to be mapped to one data subcarrier; in other words, Q=1. However, if one data bit is to be mapped to more data subcarriers in a future WLAN standard such as a next-generation WLAN standard or a further next-generation standard, the value of Q also changes accordingly. For example, if one data bit is to be mapped to four data subcarriers (or a four-carrier modulation mode is used), Q=4. For ease of description, in the following description, an example in which one data bit is to be mapped to one data subcarrier (that is, Q=1) by default when the dual-carrier modulation mode is not used is mainly used for description.

(2) Determine a number $N_{COL}$ of columns and a number $N_{ROW}$ of rows of the first interleaver.

Specifically, the number $N_{COL}$ of columns and the number $N_{ROW}$ of rows meet the following relationship:

$$(N_{COL} \times N_{ROW})/N_{BPSCS} = N_{SD} \quad (4)$$

$N_{BPSCS}$ represents a number of coded bits carried on each subcarrier of each spatial data stream (number of coded bits per subcarrier per spatial stream).

RU 78=RU 26+RU 52 is used as an example, and a total number of data subcarriers corresponding to the RU 78 is 72. It is assumed that $N_{BPSCS}$ is 1, and a number $N_{COL}$ of columns and a number $N_{ROW}$ of rows of a first interleaver corresponding to the RU 78 may be a combination such as 24×3, 18×4, 12×6, or 9×8.

In some possible designs, for a number $N_{COL}$ of columns and a number $N_{ROW}$ of rows corresponding to the first RU, values close to a number $N_{COL}$ of columns and a number $N_{ROW}$ of rows corresponding to a surrounding RU of the first RU. The surrounding RU herein is an RU for which a number of included data subcarriers is close to $N_{SD}$ of the first RU. Generally, the first RU may have a maximum of two surrounding RUs, that is, an RU (which may be referred to as a left RU of the first RU) for which a number of included data subcarriers is less than $N_{SD}$ of the first RU and is the closest to $N_{SD}$ of the first RU and an RU (which may be referred to as a right RU of the first RU) for which a number of included data subcarriers is greater than $N_{SD}$ of the first RU and is the closest to $N_{SD}$ of the first RU.

For example, the RU 78 may be 18×4 with reference to column and row values (that is, 16×3) of the RU 52 and column and row values (that is, 17×6) of the RU 106.

For example, an RU 132 may be 18×7 or 16×8 with reference to column and row values (17×6) of the RU 106.

In this way, performance of the first interleaver or the first tone mapper (for example, the RU 78) corresponding to the first RU may be similar to performance of an interleaver or a tone mapper corresponding to an already verified existing RU (that is, the RU 52 and the RU 106), so that performance of a first interleaver or a first tone mapper corresponding to a newly designed RU is ensured, and a number of tested and compared parameter groups can be reduced.

Similar to (1), if DCM is used, an operation of dividing $N_{COL}$ or $N_{ROW}$ by 2 is further required for $N_{COL}$ and $N_{ROW}$.

For example, for the RU 78, if column and row values are 18×4 when dual-carrier modulation is not used, column and row values are 9×4 when dual-carrier modulation is used.

For example, for the RU 132, if column and row values are 18×7 or 16×8 when dual-carrier modulation is not used, column and row values are 9×7 or 16×4 when dual-carrier modulation is used.

(3) If a plurality of spatial data streams are included, a frequency rotation parameter $N_{ROT}$ of the first interleaver further needs to be determined.

Specifically, the frequency rotation parameter may be determined by using the following two rules.

Rule 1: $N_{ROT}$ is determined based on a formula $$N_{ROT} = \text{floor}\left(\frac{N_{SD}}{4}\right),$$

where floor means rounding down. This formula is an empirical formula obtained with reference to values of $N_{ROT}$ of a 40 MHz bandwidth and an 80 MHz in a standard 802.11ac.

For example, for a value of $N_{ROT}$ of an RU 78, when DCM is not used, $N_{ROT}\text{-}1=\text{floor}(72/4)=18$; and when DCM is used, $N_{ROT}\text{-}2=\text{floor}(36/4)=9$.

Rule 2: A positive integer that enables a packet error rate (PER) of a receive end to be minimum or a positive integer that enables a signal-to-noise ratio (SNR) required when a PER of a receive end is a preset value to be minimum is selected from [$N_{ROT\_min}$, $N_{ROT\_max}$] as $N_{ROT}$, where $N_{ROT\_min}$ is a frequency rotation parameter of a second interleaver corresponding to an RU in which a number of included data subcarriers is less than $N_{SD}$ and is the closest to $N_{SD}$, and $N_{ROT\_max}$ is a frequency rotation parameter of a third interleaver corresponding to an RU in which a number of included data subcarriers is greater than $N_{SD}$ and is the closest to $N_{SD}$.

For example, for a value of $N_{ROT}$ of an RU 78, refer to values of $N_{ROT}$ of an RU 52 and an RU 106 through simulation. When DCM is not used, a parameter that enables an SNR required when the PER of the receive end is 10% to be minimum is selected from [11, 12, 13, 14, . . . , 29]. When DCM is not used, the value of $N_{ROT}$ of the RU 52 is 11, and the value of $N_{ROT}$ of the RU 106 is 29. When DCM is used, a value that enables the SNR required when the PER of the receive end is 10% to be minimum is selected from [2, 3, 4, 5, . . . , 11]. When DCM is used, the value of $N_{ROT}$ of the RU 52 is 2, and the value of $N_{ROT}$ of the RU 106 is 11.

Table 1 provides a possible solution for designing a parameter of an RU 78 obtained by combining an RU 26 and an RU 52 and two possible solutions for designing a parameter of an RU 132 obtained by combining an RU 106 and an RU 26.

TABLE 1

| Type | | 26 | 52 | 78 | 106 | 132 (Solution 1) | 132 (Solution 2) | 242 |
|---|---|---|---|---|---|---|---|---|
| No DCM | $N_{SD}$ | 24 | 48 | 72 | 102 | 126 | 128 | 234 |
| | $N_{COL}$ | 8 | 16 | 18 | 17 | 18 | 16 | 26 |
| | $N_{ROW}$ | 3 × Nbpscs | 3 × Nbpscs | 4 × Nbpscs | 6 × Nbpscs | 7 × Nbpscs | 8 × Nbpscs | 9 × Nbpscs |
| | $N_{ROW}$ | 2 | 11 | $N_{ROT}$ − 1 | 29 | $N_{ROT}$ − 3 | $N_{ROT}$ − 5 | 58 |
| DCM | $N_{SD}$ | 12 | 24 | 36 | 51 | 63 | 64 | 117 |
| | $N_{COL}$ | 4 | 8 | 9 | 17 | 9 | 16 | 13 |
| | $N_{ROW}$ | 3 × Nbpscs | 3 × Nbpscs | 4 × Nbpscs | 3 × Nbpscs | 7 × Nbpscs | 4 × Nbpscs | 9 × Nbpscs |
| | $N_{ROT}$ | 2 | 2 | $N_{ROT}$ − 2 | 11 | $N_{ROT}$ − 4 | $N_{ROT}$ − 6 | 29 |

For the 78-tone RU, values of parameters are as follows:

If the dual-carrier modulation mode is not used, $N_{SD}=72$, $N_{COL}=18$, $N_{ROW}=4\times N_{BPSCS}$, and $N_{ROT}\text{-}1=18$; and if the dual-carrier modulation mode is used, $N_{SD}=36$, $N_{COL}=9$, $N_{ROW}=4\times N_{BPSCS}$, and $N_{ROT}\text{-}2=9$. Certainly, values of parameters in Table 1 are only a possible example. In specific implementation, there may be another value manner. For example, when the dual-carrier modulation mode is used, the values of the parameters may alternatively be: $N_{SD}=36$, $N_{COL}=18$, $N_{ROW}=2\times N_{BPSCS}$, and $N_{ROT}\text{-}2=9$.

For the 132-tone RU, the RU 106 includes 102 data subcarriers and four pilot subcarriers. If direct splicing is performed, 126 data subcarriers and six pilot subcarriers are included. An idea similar to the RU 78 is used, and a value of a parameter of an interleaver of the RU 132 is shown in the solution 1 of the RU 132 in Table 1.

If the dual-carrier modulation mode is not used, $N_{SD}$ is 126, $N_{COL}=18$, and $N_{ROW}=7\times N_{BPSCS}$. If the dual-carrier modulation mode is used, $N_{SD}$ is 63, $N_{COL}=9$, and $N_{ROW}=7\times N_{BPSCS}$.

To further improve transmission efficiency, for the 132-tone RU, two data subcarriers may be added, and two pilot subcarriers may be reduced. For example, if all subcarriers in the RU 26 are used as data subcarriers, 128 data subcarriers and four pilot subcarriers are included, and a value of a parameter of an interleaver is shown in the solution 2 of the RU 132 in the table.

If the dual-carrier modulation mode is not used, $N_{SD}$ is 128, $N_{COL}=16$, and $N_{ROW}=8\times N_{BPSCS}$. If the dual-carrier modulation mode is used, $N_{SD}$ is 64, $N_{COL}=16$, and $N_{ROW}=4\times N_{BPSCS}$.

Values of $N_{ROT}\text{-}3$, $N_{ROT}\text{-}4$, $N_{ROT}\text{-}5$, and $N_{ROT}\text{-}6$ may be determined based on the foregoing rule 1 and rule 2. The values may be specifically the following values.

TABLE 2

| $N_{ROT}$ | Rule 1 | Rule 2 |
|---|---|---|
| $N_{ROT}\text{-}3$ | 31 | From 29 to 58 (including 29 and 58), $N_{ROT}\text{-}3$ obtained when an SNR corresponding to a PER of 10% is minimum |
| $N_{ROT}\text{-}4$ | 15 | From 11 to 29, $N_{ROT}\text{-}4$ obtained when an SNR corresponding to a PER of 10% is minimum |
| $N_{ROT}\text{-}5$ | 32 | From 29 to 58 (including 29 and 58), $N_{ROT}\text{-}5$ obtained when an SNR corresponding to a PER of 10% is minimum |

TABLE 2-continued

| $N_{ROT}$ | Rule 1 | Rule 2 |
|---|---|---|
| $N_{ROT}$-6 | 16 | From 11 to 29, $N_{ROT}$-6 obtained when an SNR corresponding to a PER of 10% is minimum |

A simulation example of $N_{ROT}$-1 is provided below.

Figure 12A:
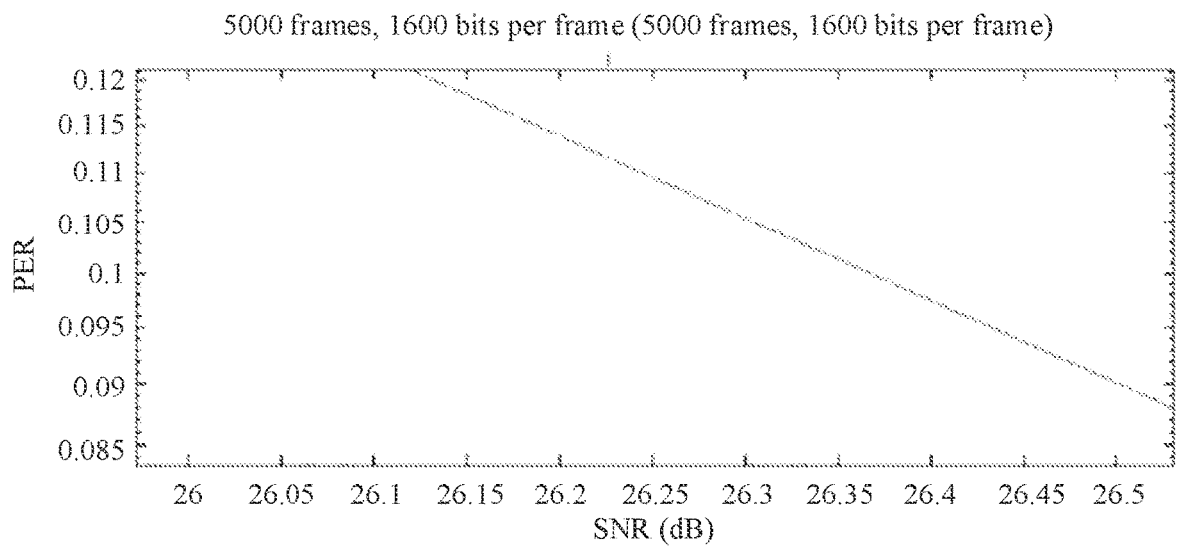
FIG. 12A and FIG. 12B are diagrams of PER curves.
Figure 12B:
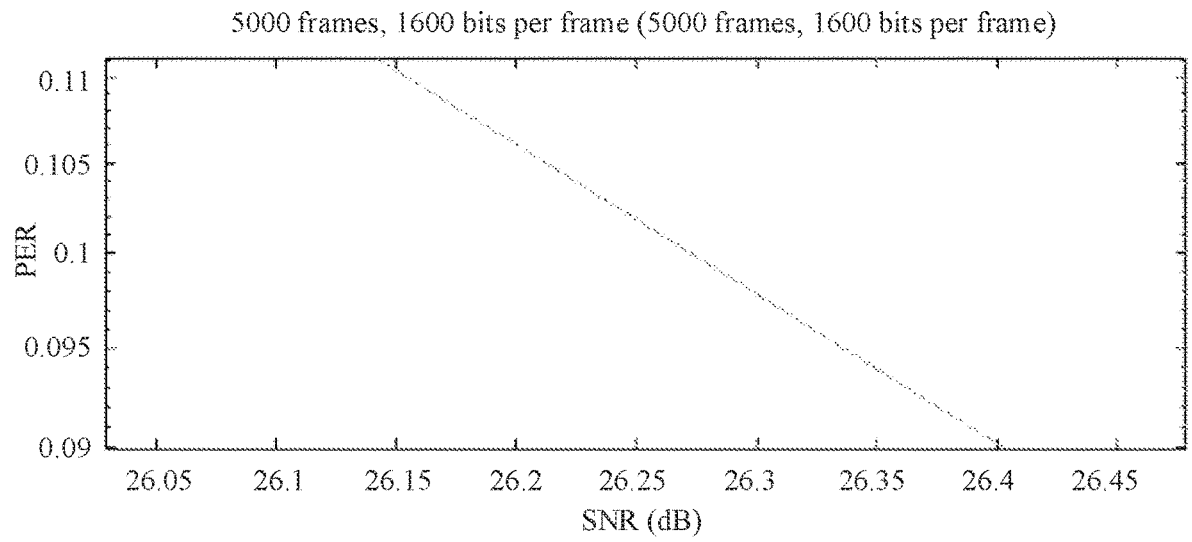

There are four antennas at the transmit end and three antennas at the receive end, there are three spatial streams, and BCC coding is used. A modulation and coding scheme MCS5, that is, 64 QAM, and a bit rate 2/3 are used. For a 78-tone RU, $N_{COL}$ and $N_{ROW}$ are shown in Table 1, and different $N_{ROT}$-1 is selected to obtain different PER curves, and a signal-to-noise ratio SNR corresponding to a PER of 10% is selected for comparison, to obtain optimal $N_{ROT}$-1 through calculation. When $N_{ROT}$-1=11, a PER curve is shown in FIG. 12A, and an SNR corresponding to the PER of 10% is 26.35. When $N_{ROT}$-1=29, a PER curve is shown in FIG. 12B, and an SNR corresponding to the PER of 10% is 26.25.

Similarly, for other different values of $N_{ROT}$-1, a value of an SNR corresponding to a PER of 10% is as follows:

TABLE 3

| | $N_{ROT\_1}$ | | | | | | |
|---|---|---|---|---|---|---|---|
| 11 | 13 | 15 | 17 | 18 | 19 | 21 | 29 |
| SNR 26.35 | 26.28 | 26.38 | 26.25 | 26.31 | 26.24 | 26.27 | 26.25 |

It can be learned from a simulation result shown in Table 3 that in the foregoing simulation configuration case, optimal $N_{ROT}$-1 is 19. Certainly, another value of $N_{ROT}$-1 whose SNR has a difference less than 0.1 dB from an SNR corresponding to 19 may also be a candidate value.

Certainly, for different numbers of spatial streams and different modulation and coding schemes MCS, an optimal value of $N_{ROT}$-1 may differ. After comprehensive consideration, values of $N_{ROT}$ with a largest number of optimal and sub-optimal cases in a plurality of different cases may be selected.

Principles of $N_{ROT}$-2, $N_{ROT}$-3, and $N_{ROT}$-4 are similar to this, and details are not described herein again.

It should be noted that, when the transmit end performs a specific interleaving operation by using the first interleaver, a process of determining the parameter of the first interleaver may be merely a table lookup process (for example, searching for a parameter in Table 1 or Table 2) or a mapping lookup process. Method steps in (1), (2), and (3) are merely to describe a principle/process of designing the parameter of the first interleaver in this embodiment of this application, and are not necessarily equivalent to the process of determining the parameter of the first interleaver.

A simple interleaving method for combination of several specific RUs (the RU 26, the RU 52, the RU 106, or the like) in BCC coding is provided in this embodiment, and a specific method for designing a number of data subcarriers, a number of pilot subcarriers, and an interleaver parameter (for example, $N_{COL}$, $N_{ROW}$, and $N_{ROT}$) is provided for a unified interleaver (that is, the first interleaver) corresponding to an RU obtained after combination. In this way, flexibility of this solution is improved, and hardware costs of the interleaver can be effectively reduced.

Embodiment 2

Design of a parameter of the first tone mapper is mainly described in Embodiment 2. An idea of Embodiment 2 is similar to that of Embodiment 1, and a plurality of small RUs may be considered as a combined large RU. A difference lies in that a parameter is designed as a parameter of a tone mapper for LDPC coding.

The parameter of the first tone mapper includes a number $N_{SD}$ of data subcarriers. For a specific determining method, refer to the method for determining the number of data subcarriers of the first interleaver in Embodiment 1. Details are not described herein again.

The parameter of the first tone mapper further includes a tone mapping distance parameter $D_{TM}$ that may be understood as a degree to which continuous bits are scrambled, as shown in Table 4.

TABLE 4

| Type | | 26 | 52 | 78 | 106 | 132 Solution 1 | 132 Solution 2 | 242 | 484 | 996 | 2*996 |
|---|---|---|---|---|---|---|---|---|---|---|---|
| No DCM, | $D_{TM}$ | 1 | 3 | $D_{TM}$ - 1 | 6 | $D_{TM}$ - 3 | $D_{TM}$ - 5 | 9 | 12 | 20 | 20 |
| DCM | $D_{TM}$ | 1 | 1 | $D_{TM}$ - 2 | 3 | $D_{TM}$ - 4 | $D_{TM}$ - 6 | 9 | 9 | 14 | 14 |

A necessary requirement that $D_{TM}$ meets is: $D_{TM}$ is a common divisor of $N_{SD}$.

A method for designing $D_{TM}$ includes but is not limited to the following three rules:

Rule 1: A positive integer is selected from $[D_{TM\_min}, D_{TM\_max}]$ as $D_{TM}$, where $D_{TM\_min}$ is a tone mapping distance parameter corresponding to a second tone mapper corresponding to an RU in which a number of included data subcarriers is less than $N_{SD}$ and is the closest to $N_{SD}$, and $D_{TM\_max}$ is a tone mapping distance parameter corresponding to a third tone mapper corresponding to an RU in which a number of included data subcarriers is greater than $N_{SD}$ and is the closest to $N_{SD}$.

For example, for $D_{TM}$-1 of an RU 78, refer to values of a surrounding RU 52 and RU 106. A positive integer is selected from [3, 6]. Because $D_{TM}$-1 needs to be a common divisor of $N_{SD}$=72 when there is no DCM, $D_{TM}$-1 may be 4 or 6.

Rule 2: A ratio $N_{SD}/N_{COL}$ of $N_{SD}$ to $N_{COL}$ of a first interleaver with a same RU size as the first tone mapper is used as $D_{TM}$.

For example, for an RU 78, when there is no DCM, for a first interleaver corresponding to the RU 78, $N_{SD}$=72, and $N_{COL}$=18. If this rule is used, $D_{TM}$-1=4. When there is DCM, $D_{TM}$-2 may be 2 or 3.

Rule 3: Through simulation, a positive integer that enables a PER of a receive end to be minimum or a positive integer that enables an SNR required when a PER of a receive end is a preset value (for example, 10%) to be minimum is selected from $[D_{TM\_min}, D_{TM\_max}]$ as $D_{TM}$.

Similarly, $D_{TM}$-3 may be 7 or 9 when the rule 1 is used, and may be 7 when the rule 2 is used.

Similarly, $D_{TM}$-4 may be 7 or 9 when the rule 1 is used, and may be 7 when the rule 2 is used.

Similarly, $D_{TM}$-5 may be 8 when the rule 1 is used, and may be 8 when the rule 2 is used.

Similarly, $D_{TM}$-6 may be 4 or 8 when the rule 1 is used, and may be 8 when the rule 2 is used.

It should be noted that, when the transmit end performs a specific tone mapping operation by using the first tone mapper, a process of determining the parameter of the first tone mapper may be merely a table lookup process (for example, searching for a parameter in Table 4) or a mapping lookup process. The foregoing method steps are merely to describe a principle/process of designing the parameter of the first tone mapper in this embodiment of this application, and are not necessarily equivalent to the process of determining the parameter of the first tone mapper.

A simple tone mapping method for combination of several specific RUs (an RU 26, an RU 52, an RU 106, or the like) in LDPC coding is provided in this embodiment, and a specific method for designing a number of data subcarriers, a number of pilot subcarriers, and a tone mapper parameter (for example, $D_{TM}$) is provided for a unified tone mapper (that is, the first tone mapper) corresponding to an RU obtained after combination. In this way, hardware costs of the tone mapper can be effectively reduced.

Embodiment 3

Design of a parameter in LDPC coding for a combined large RU including M 242-tone RUs is mainly described in Embodiment 3.

For combination of two 242-tone RUs and combination of four 242-tone RUs, parameters of a 484-tone RU and a 996-tone RU may be reused, as shown in Table 5 below.

value (for example, 80 MHz), the total bandwidth of the M RUs may be first segmented, and then the method procedure shown in FIG. 10 is separately performed for an RU in each segment.

Figure 13:
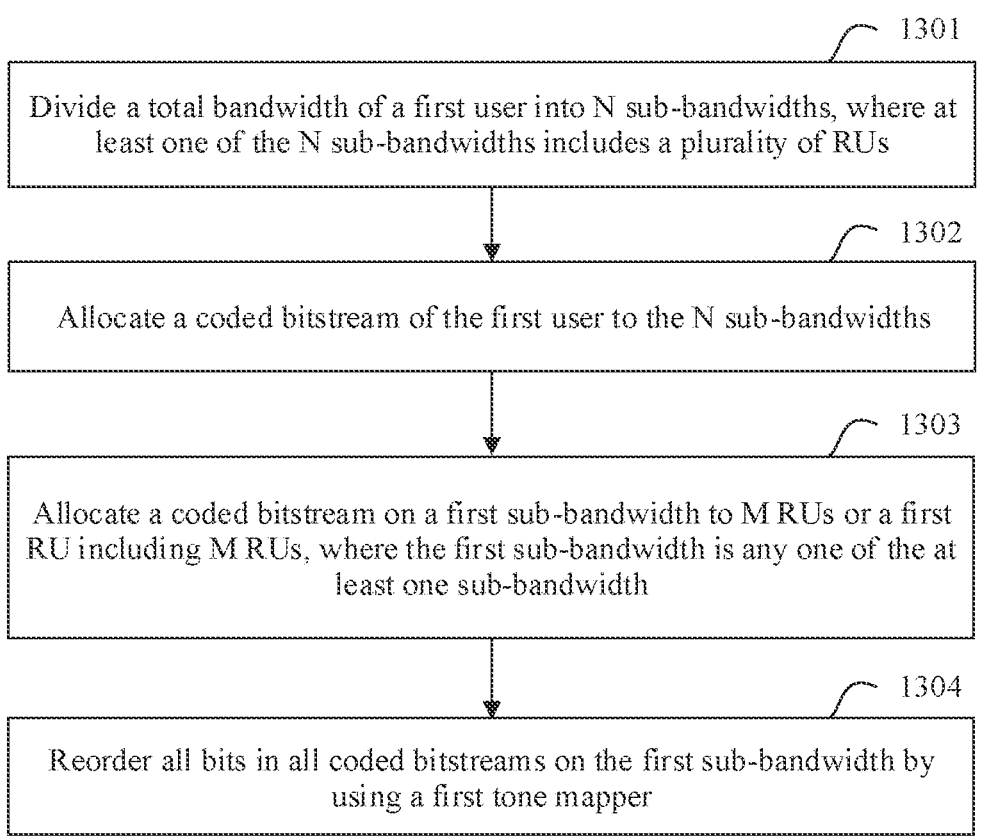
FIG. 13 is a schematic flowchart of another data processing method according to an embodiment of this application.

FIG. 13 shows another data processing method according to an embodiment of this application. The method includes the following steps:

S1301: A transmit end divides a total bandwidth of a first user into N sub-bandwidths, where at least one of the N sub-bandwidths includes a plurality of RUs.

S1302: The transmit end allocates a coded bitstream of the first user to the N sub-bandwidths.

S1303: The transmit end allocates a coded bitstream on a first sub-bandwidth to M RUs or a first RU including M RUs, where the first sub-bandwidth is any one of the at least one sub-bandwidth.

S1304: The transmit end reorders all bits in all coded bitstreams on the first sub-bandwidth by using a first tone mapper.

It should be understood that, if two sub-bandwidths in the N sub-bandwidths are different, parameter design of tone mappers separately corresponding to the two sub-bandwidths may be different. For example, if the first sub-bandwidth and a second sub-bandwidth in the N sub-bandwidths are different in size, a parameter of a first tone mapper corresponding to the first sub-bandwidth is different from a parameter of a second tone mapper corresponding to the second sub-bandwidth.

Design of a parameter in LDPC coding for a combined large RU including M 242-tone RUs is used as an example below, and M is greater than 5.

TABLE 5

| Type | | 242 | 484 or 242 × 2 | 242 × 3 | 996 or 242 × 4 | 2 × 996 or 242 × 8 |
|---|---|---|---|---|---|---|
| No DCM, | $N_{SD}$ | 234 | 234 × 2 | 234 × 3 | 980 or 234 × 4 | 980 × 2 or 234 × 8 |
|  | $D_{TM}$ | 9 | 12 | $D_{TM}$ − 1 | 20 | 20 |
| DCM | $N_{SD}$ | 117 | 234 | 117 × 3 | 490 or 234 × 2 | 980 or 234 × 4 |
| (Dual-carrier modulation) | $D_{TM}$ | 9 | 9 | $D_{TM}$ − 2 | 14 | 14 |

For a 242×3-tone RU, similar to a principle in Embodiment 2, refer to values of $D_{TM}$ of RUs (that is, a 484-tone RU and a 996-tone RU) that already exist on the left and the right of the 242×3-tone RU. In addition, in consideration of a fact that $D_{TM}$-1 needs to be a common divisor of $N_{SD}$, a value of $D_{TM}$-1 may be 13 or 18.

Similarly, $D_{TM}$-2 is 9 or 13. Because it is specified in an 802.11ax standard that BCC coding is not used for an RU whose number of subcarriers is greater than 242 tones, a value of $D_{TM}$ cannot be obtained by using a parameter of BCC herein.

Certainly, optimal $D_{TM}$-1 and optimal $D_{TM}$-2 may alternatively be obtained through simulation.

A simple tone mapping method for combination of a plurality of RUs 242 in LDPC coding is provided in this embodiment, and a specific method for designing a number of data subcarriers, a number of pilot subcarriers, and a tone mapper parameter (for example, $D_{TM}$) is provided for a unified tone mapper (that is, the first tone mapper) corresponding to an RU obtained after combination. In this way, flexibility of this solution is improved, and hardware costs of the tone mapper can be effectively reduced.

Embodiment 4

The following is mainly described in Embodiment 4: When a total bandwidth of M RUs is greater than a preset That M is greater than 5 indicates that a total bandwidth of the M 242-tone RUs is at least greater than 80 MHz. A maximum bandwidth in 802.11ax is 160 MHz. In this case, the entire bandwidth may be divided into two parts in units of 80 MHz. Each 80 MHz is referred to as a segment. Therefore, when M is greater than 5, there are at least two segments, and certainly, there may be three segments (a total bandwidth is 240 MHZ) or four segments (a total bandwidth is 320 MHz). The total bandwidth is determined because some channels of the entire bandwidth are punctured, and an RU obtained when subcarriers on remaining channels are equivalently combined is a 242×n-tone RU. Herein, n may be different values, for example, n=1, . . . , M.

Figure 14:
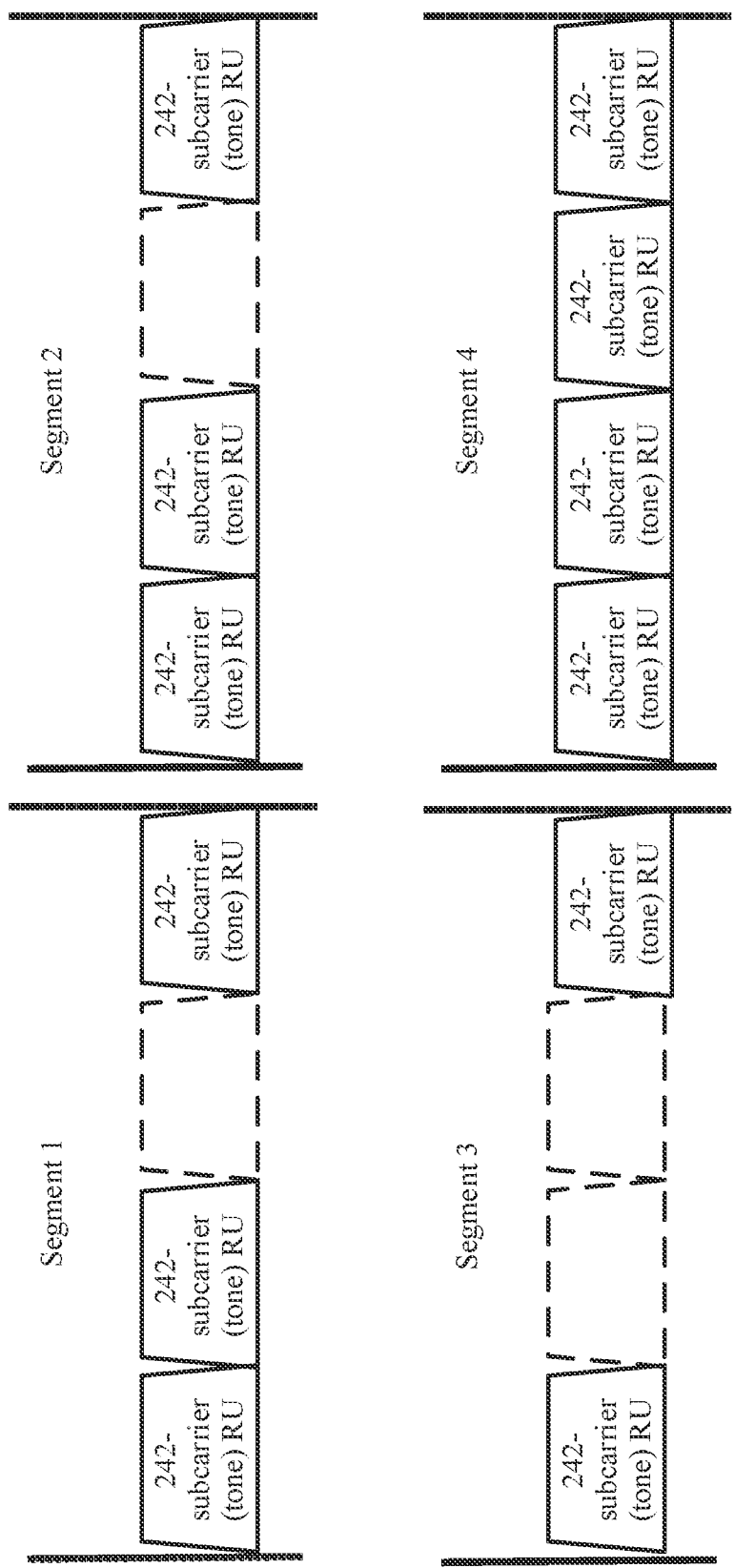
FIG. 14 is a schematic diagram of segmentation of a total bandwidth of a first user.

For example, refer to FIG. 14. Each trapezoid in FIG. 14 represents one 242-tone RU, and there are a total of twelve 242-tone RUs; in other words, M=12. Based on a segmentation case in FIG. 14, there are a total of four segments.

When there are a plurality of segments, segment parsing is first performed in units of segments. Then, in each segment, a plurality of existing RUs are equivalently combined, and an RU obtained after combination is performed in each segment may be a 242-tone RU, a 484-tone RU, a 242×3-tone RU, or a 242×4-tone RU.

Figure 15:
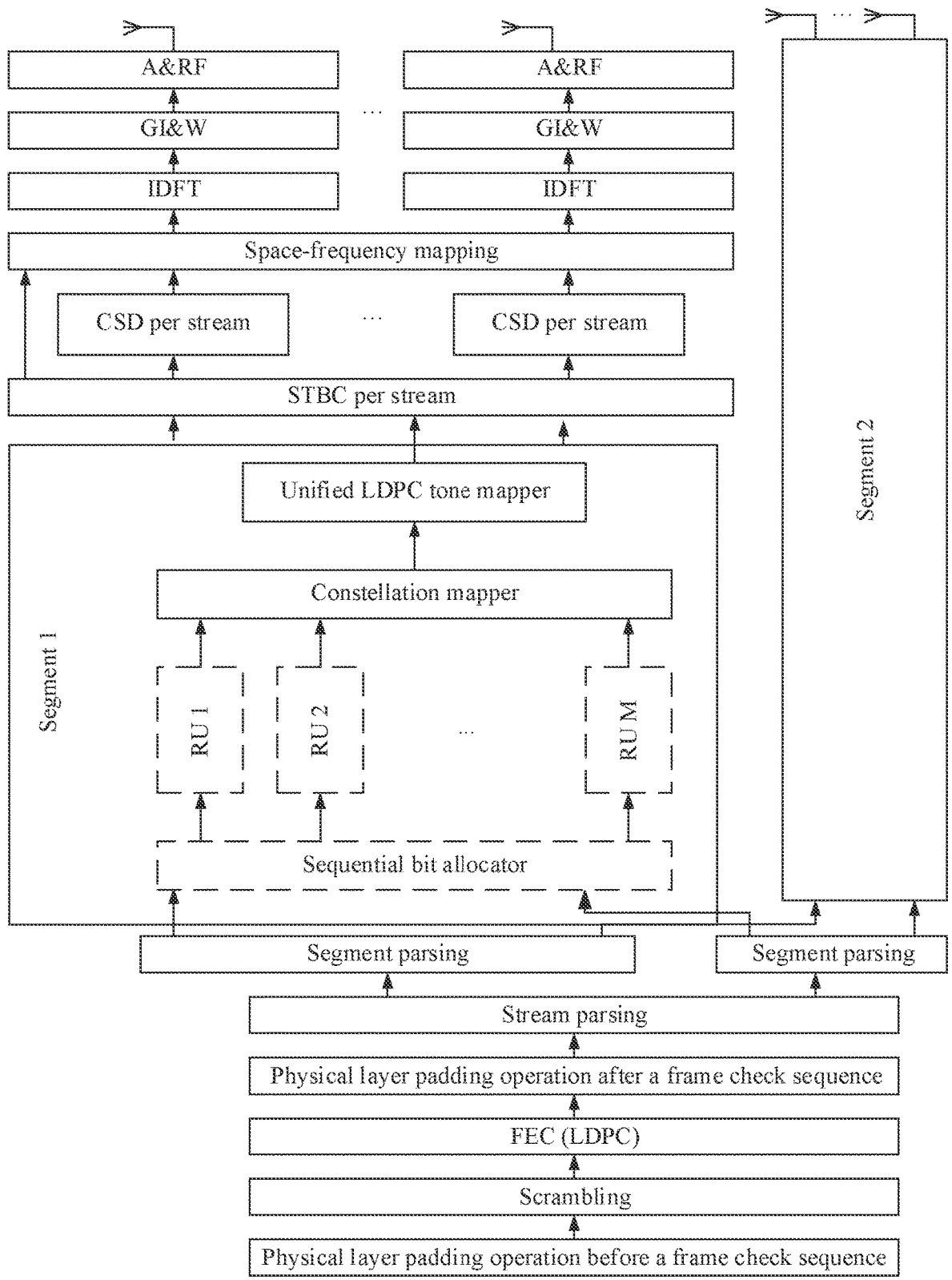
FIG. 15 is a schematic flowchart of a tone mapper when a total bandwidth of M RUs is segmented.

FIG. 15 shows a procedure of an LDPC tone mapper for segmenting a total bandwidth of M RUs. As shown in FIG.

15, a transmit end first sequentially performs pre-FEC physical layer padding, FEC (LDPC) coding, a post-FEC physical layer padding operation, and data stream parsing on data bits; then performs segment parsing on a coded data stream that is output after stream parsing, and separately performs the following operations for each segment: constellation mapping, a tone mapping operation, space time block code (STBC) coding, CSD per stream, space-frequency mapping, inverse discrete Fourier transform (IDFT), guard interval and windowing (GI&W), and analog and radio frequency (A&RF); and finally sends the data stream by using an antenna. A unified tone mapping operation is performed on bits in each segment by using an LDPC tone mapper.

In some special cases, for example, when there is a 242×2-tone RU in a first segment and there is a 242×1-tone RU in a second segment, although n=3, a procedure in which segmentation is performed first and then LDPC tone mapping is performed in each segment may still be used.

A method in which segmentation is performed first and then unified tone mapping is separately performed for RUs in each segment is provided in Embodiment 4. In this way, flexibility of this solution is improved, and a problem that hardware costs of the LDPC tone mapper are high when the total bandwidth is relatively large is resolved.

A method procedure performed by the transmit end is described in the foregoing embodiments. For a method procedure performed by a receive end, an inverse process of the transmit end is performed.

Figure 16:
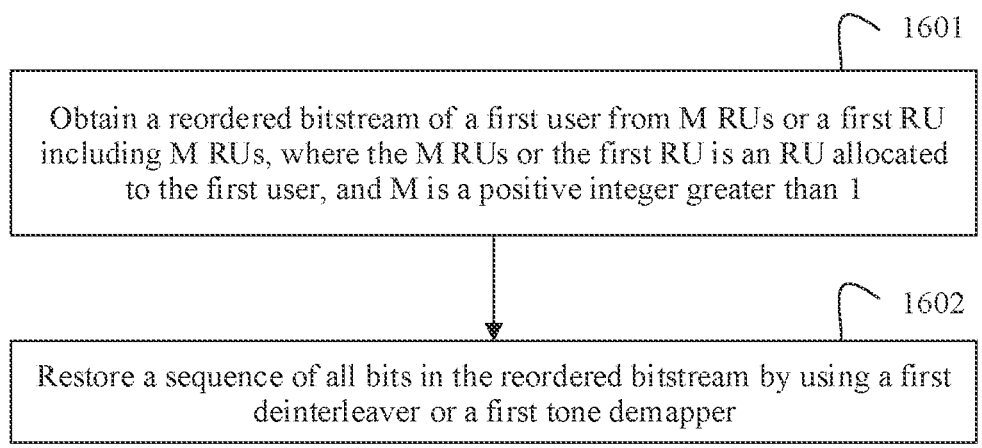
FIG. 16 is a schematic flowchart of another data processing method according to an embodiment of this application.

FIG. 16 shows another data processing method according to an embodiment of this application. The method may be applied to the WLAN system shown in FIG. 9. The method includes the following steps:

S1601: A receive end obtains a reordered bitstream of a first user from M RUs or a first RU including M RUs, where the M RUs or the first RU is an RU allocated to the first user, and M is a positive integer greater than 1.

S1602: The receive end restores a sequence of all bits in the reordered bitstream by using a first deinterleaver or a first tone demapper.

A type of the receive end may be a STA, or may be an AP, and this is not limited herein. The M RUs or the first RU allocated to the first user is the same as that in the foregoing embodiment shown in FIG. 10. Details are not described herein again.

Figure 17:
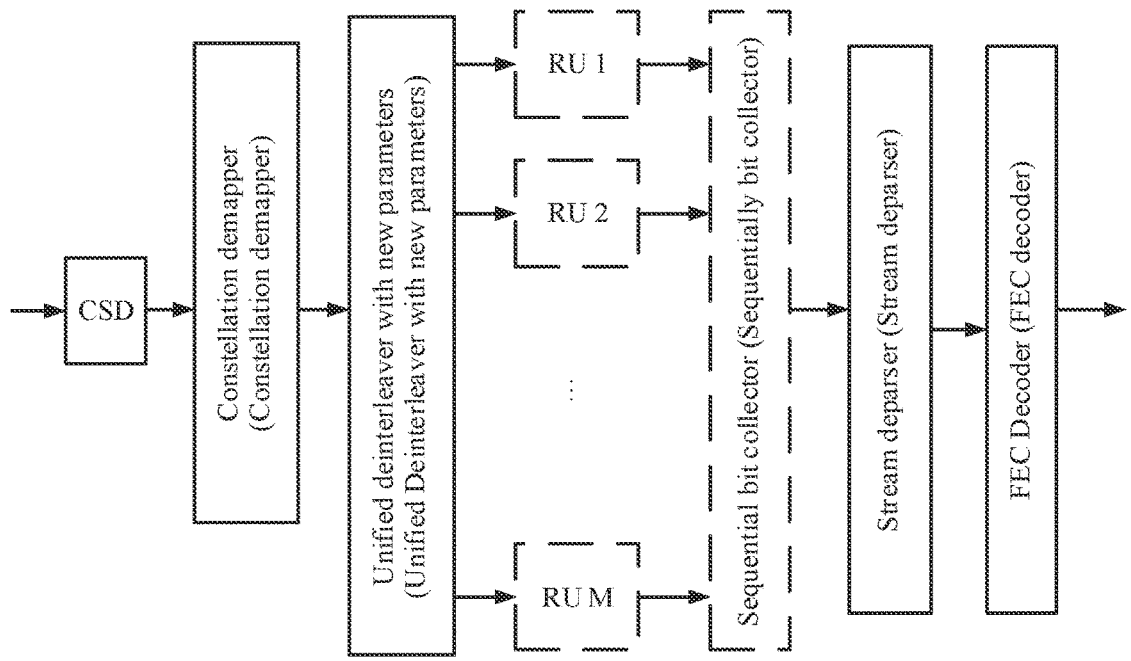
FIG. 17 is a schematic flowchart of another data processing method according to an embodiment of this application.

Specifically, an entire process of the first deinterleaver is an inverse process of the first interleaver. As shown in FIG. 17, after sequentially performing CSD and constellation mapping on received signals, the receive end performs unified deinterleaving by using a first deinterleaver with new parameters, and then extracts, in sequence, a bitstream from a large RU (that is, the first RU) obtained after combining the M RUs, performs inverse stream parsing, and finally performs BCC decoding. Parameters ($N_{SD}$, $N_{ROW}$, and $N_{COL}$) of the first deinterleaver entirely correspond to the parameters ($N_{SD}$, $N_{ROW}$, and $N_{COL}$) of the first interleaver, and details are not described herein again.

Figure 18:
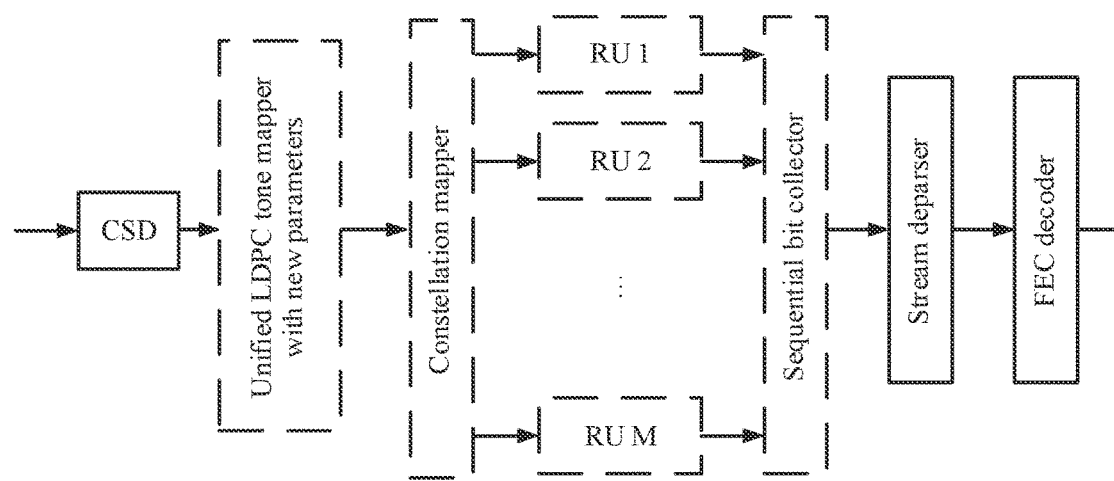
FIG. 18 is a schematic flowchart of another data processing method according to an embodiment of this application.

Similarly, an entire process of the first tone demapper is an inverse process of the first tone mapper. As shown in FIG. 18, after separately performing CSD on received signals, the receive end performs unified demapping by using a first tone demapper with new parameters, and then performs a constellation demapping operation, extracts, in sequence, a bitstream from a large RU (that is, the first RU) obtained after combining the M RUs, and performs inverse stream parsing, and finally performs BCC decoding. Parameters ($N_{SD}$ and $D_{TM}$) of the first tone demapper entirely correspond to the parameters ($N_{SD}$ and $D_{TM}$) of the first tone mapper, and details are not described herein again.

The foregoing embodiments may be combined to implement different technical effects.

The data processing method in embodiments of this application is described above, and a data processing apparatus in embodiments of this application is described below.

Figure 19:
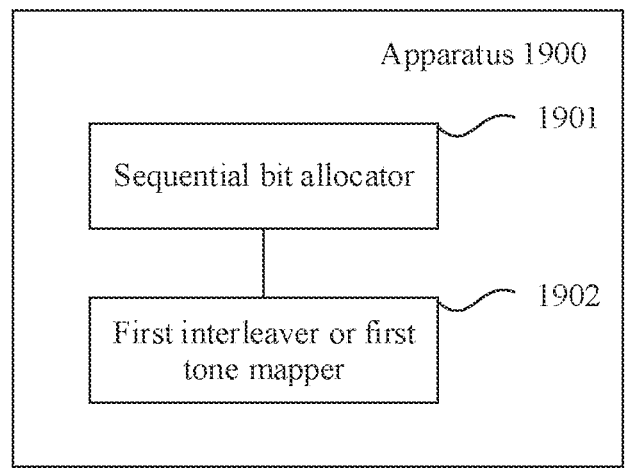
FIG. 19 is a schematic diagram of a structure of a first type of data processing apparatus 1900 at a transmit end according to an embodiment of this application.

FIG. 19 shows a first type of processing apparatus 1900 at a transmit end according to an embodiment of this application. The processing apparatus 1900 includes:
a sequential bit allocator 1901, configured to allocate a coded bitstream of a first user to M RUs or a first RU including M RUs, where the M RUs or the first RU is an RU allocated to the first user, and M is a positive integer greater than 1; and
a first interleaver or a first tone mapper 1902, configured to reorder all bits in the coded bitstream.

The data processing apparatus 1900 in this embodiment of this application has any function of the transmit end in the foregoing methods, and details are not described herein again.

Figure 20:
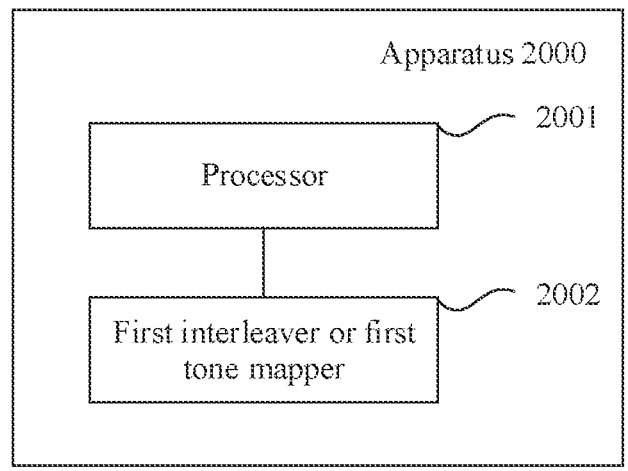
FIG. 20 is a schematic diagram of a structure of a second type of data processing apparatus 2000 at a transmit end according to an embodiment of this application.

FIG. 20 shows a second type of data processing apparatus 2000 at a transmit end according to an embodiment of this application. The data processing apparatus 2000 includes:
a processor 2001, configured to input all bits in a coded bitstream of a first user into a first interleaver or a first tone mapper, where M RUs or a first RU including M RUs is allocated to the first user, and M is a positive integer greater than 1; and
the first interleaver or the first tone mapper 2002, configured to reorder all bits in the coded bitstream.

The data processing apparatus 2000 in this embodiment of this application has any function of the transmit end in the foregoing methods, and details are not described herein again.

Figure 21:
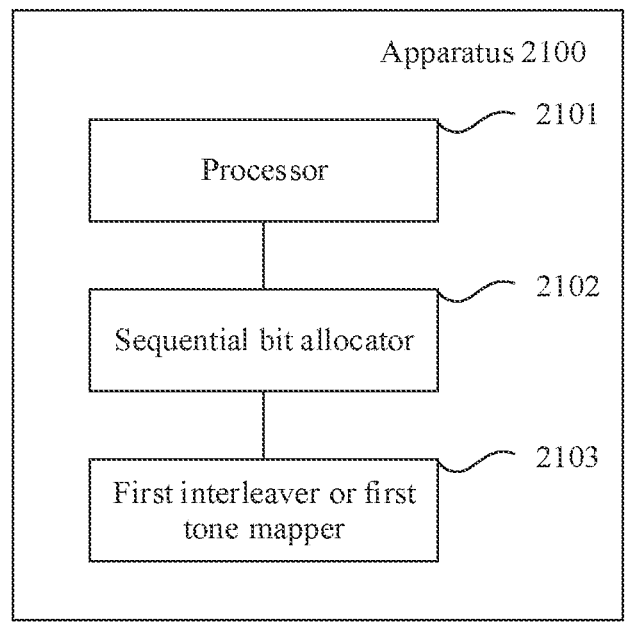
FIG. 21 is a schematic diagram of a structure of a third type of data processing apparatus 2100 at a transmit end according to an embodiment of this application.

FIG. 21 shows a third type of data processing apparatus 2100 at a transmit end according to an embodiment of this application. The data processing apparatus 2100 includes:
a processor 2101, configured to divide a total bandwidth of a first user into N sub-bandwidths, where at least one of the N sub-bandwidths includes a plurality of RUs;
a sequential bit allocator 2102, configured to: allocate a coded bitstream of the first user to the N sub-bandwidths, and allocate a coded bitstream on a first sub-bandwidth to M RUs or a first RU including M RUs, where the first sub-bandwidth is any one of the at least one sub-bandwidth; and
a first interleaver or a first tone mapper 2103, configured to reorder all bits in all coded bitstreams on the first sub-bandwidth.

The data processing apparatus 2100 in this embodiment of this application has any function of the transmit end in the foregoing methods, and details are not described herein again.

The data processing apparatus at the transmit end in embodiments of this application is described above, and a possible product form of the data processing apparatus at the transmit end is described below. It should be understood that any product of any form that has a function of the processing apparatus shown in FIG. 19 to FIG. 21 falls within the protection scope of embodiments of this application. It should also be understood that the following descriptions are merely examples, and a product form of the data processing apparatus in embodiments of this application is not limited thereto.

In a possible product form, the data processing apparatus in embodiments of this application may be implemented by a general bus architecture.

The sequential bit allocator and the first interleaver may be implemented by a processor, or the sequential bit allocator and the first tone mapper may be implemented by a processor.

Optionally, the data processing apparatus may further include a memory, and the memory is configured to store instructions executed by the processor.

In a possible product form, the data processing apparatus in embodiments of this application may be implemented by a sequential bit allocation circuit and an interleaving circuit, or may be implemented by a sequential bit allocation circuit and a tone mapping circuit.

Optionally, the data processing apparatus may further include a storage medium, and the storage medium is configured to store instructions executed by the sequential bit allocation circuit and the interleaving circuit, or is configured to store instructions executed by the sequential bit allocation circuit and the tone mapping circuit.

In a possible product form, the data transmission apparatus in embodiments of this application may be alternatively implemented by using the following: one or more FPGAs (field programmable gate array), a PLD (programmable logic device), a controller, a state machine, gate logic, a discrete hardware component, any other suitable circuit, or any combination of circuits that can execute various functions described in this application.

It should be understood that the foregoing data processing apparatuses in various product forms have any function of a data processing apparatus located at the transmit end in the foregoing method embodiments, and details are not described herein again.

Figure 22:
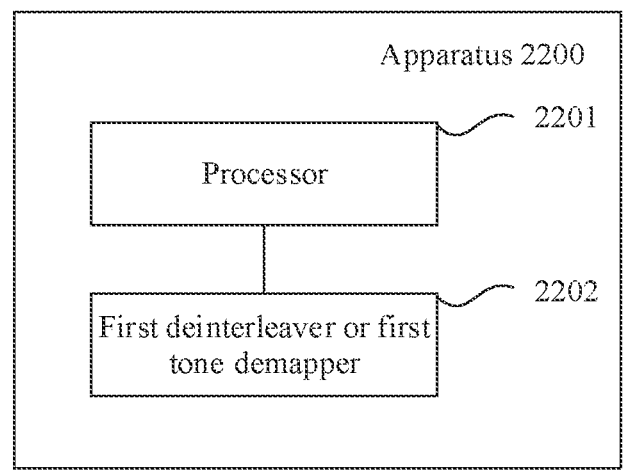
FIG. 22 is a schematic diagram of a structure of a data processing apparatus 2200 at a receive end according to an embodiment of this application.

FIG. 22 shows a data processing apparatus 2200 at a receive end according to an embodiment of this application. The data processing apparatus 2200 includes:
  a processor 2201, configured to obtain a reordered bitstream of a first user from M RUs or a first RU including M RUs, where the M RUs or the first RU is an RU allocated to the first user, and M is a positive integer greater than 1; and
  a first deinterleaver or a first tone demapper 2202, configured to restore a sequence of all bits in the reordered bitstream.

The data processing apparatus 2200 in this embodiment of this application has any function of the receive end in the foregoing methods, and details are not described herein again.

The data processing apparatus at the receive end in embodiments of this application is described above, and a possible product form of the data processing apparatus at the receive end is described below. It should be understood that any product of any form that has a function of the data apparatus shown in FIG. 22 falls within the protection scope of embodiments of this application. It should also be understood that the following descriptions are merely examples, and a product form of the data processing apparatus in embodiments of this application is not limited thereto.

In a possible product form, the data processing apparatus in embodiments of this application may be implemented by a general bus architecture.

The processor and the first deinterleaver may be implemented by a processor, or the processor and the first tone demapper may be implemented by a processor.

Optionally, the data processing apparatus may further include a memory, and the memory is configured to store instructions executed by the processor.

In a possible product form, the data processing apparatus in embodiments of this application may be implemented by a processing circuit and a deinterleaving circuit, or may be implemented by a processing circuit and a tone demapping circuit.

Optionally, the data processing apparatus may further include a storage medium, and the storage medium is configured to store instructions executed by the processing circuit and the deinterleaving circuit, or is configured to store instructions executed by the processing circuit and the tone demapping circuit.

In a possible product form, the data transmission apparatus in embodiments of this application may be alternatively implemented by using the following: one or more FPGAs (field programmable gate array), a PLD (programmable logic device), a controller, a state machine, gate logic, a discrete hardware component, any other suitable circuit, or any combination of circuits that can execute various functions described in this application.

It should be understood that the foregoing data processing apparatuses in various product forms have any function of a data processing apparatus located at the receive end in the foregoing method embodiments, and details are not described herein again.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor or any conventional processor or the like. The steps of the method disclosed with reference to embodiments of this application may be directly performed by a hardware processor, or may be performed by using a combination of hardware in the processor and a software module.

The memory involved in embodiments of this application may be a non-volatile memory such as a hard disk drive (HDD) or a solid-state drive (SSD), or may be a volatile memory such as a random access memory (RAM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store the program instructions and/or the data.

A person of ordinary skill in the art may be aware that, in combination with the examples described in embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of embodiments in this application.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A computer program product comprising programming instructions stored in embodied on a non-transitory computer readable storage medium for enabling a computer to perform operations comprising:
inputting bits in a coded bitstream into a first interleaver, wherein the coded bitstream is allocated to a first resource unit (RU) for a first user, wherein the first RU comprises M RUs, and M is an integer greater than 1; and
reordering the bits in the coded bitstream by using the first interleaver, wherein a number $N_{SD}$ of data subcarriers of the first interleaver is a positive integer within $[N_{SD\_min}/Q, N_{SD\_max}/Q]$, wherein $N_{SD\_min}$ is a sum of data subcarriers comprised in the first RU, $N_{SD\_max}$ is a sum of subcarriers comprised in the first RU, and Q is a number of data subcarriers to which a bit is mapped.

2. The computer program product according to claim 1, wherein a number of columns $N_{COL}$, and a number of rows $N_{ROW}$ of the first interleaver satisfy:
$(N_{COL} \times N_{ROW})/N_{BPSCS} = N_{SD}$, wherein $N_{BPSCS}$ is a number of coded bits carried on each subcarrier of each spatial data stream.

3. The computer program product according to claim 2, when the coded bitstream comprises a plurality of spatial data streams,
a frequency rotation parameter $N_{ROT}$ of the first interleaver is determined based on an equation $$N_{ROT} = \mathrm{floor}\left(\frac{N_{SD}}{4}\right),$$

wherein floor( ) represents a floor function.

4. The computer program product according to claim 3, wherein the first RU comprise a 26-tone RU and a 52-tone RU, and wherein when a dual-carrier modulation mode is unused, $N_{SD}=72$, $N_{COL}=18$, $N_{ROW}=4 \times N_{BPSCS}$, and $N_{ROT}=18$.

5. The computer program product according to claim 3, wherein the first RU comprises a 26-tone RU and a 106-tone RU, and wherein:
when a dual-carrier modulation mode is unused, $N_{SD}$ is 126, $N_{ROT}$ is a positive integer between 29 and 58; or
when the dual-carrier modulation mode is used, $N_{SD}$ is 63.

6. The computer program product according to claim 3, wherein the first RU comprises a 26-tone RU and a 106-tone RU, and wherein a value of $N_{ROW}$ when the dual-carrier modulation mode is unused is twice a value of $N_{ROW}$ when the dual-carrier modulation mode is used.

7. The computer program product according to claim 5, wherein when the dual-carrier modulation mode is unused, $N_{ROT}=31$.

8. A non-transitory computer-readable medium storing programming instructions executable by a computer to perform operations comprising:
inputting bits in a coded bitstream into a first interleaver, wherein the coded bitstream is allocated to a first resource unit (RU) for a first user, wherein the first RU comprises M RUs, and M is an integer greater than 1; and
reordering the bits in the coded bitstream, wherein a number $N_{SD}$ of data subcarriers of the first interleaver is a positive integer within $[N_{SD\_min}/Q, N_{SD\_max}/Q]$, wherein $N_{SD\_min}$ is a sum of data subcarriers comprised in the first RU, $N_{SD\_max}$ is a sum of subcarriers comprised in the first RU, and Q is a number of data subcarriers to which a bit is mapped.

9. The non-transitory computer-readable medium according to claim 8, wherein a number of columns $N_{COL}$, and a number of rows $N_{ROW}$ of the first interleaver satisfy:

$(N_{COL} \times N_{ROW})/N_{BPSCS} = N_{SD}$, wherein $N_{BPSCS}$ is a number of coded bits carried on each subcarrier of each spatial data stream.

10. The non-transitory computer-readable medium according to claim 9, when the coded bitstream comprises a plurality of spatial data streams,
a frequency rotation parameter $N_{ROT}$ of the first interleaver is determined based on an equation $$N_{ROT} = \text{floor}\left(\frac{N_{SD}}{4}\right),$$

wherein floor( ) represents a floor function.

11. The non-transitory computer-readable medium according to claim 10, wherein the first RU comprises a 26-tone RU and a 52-tone RU, and wherein when a dual-carrier modulation mode is unused, $N_{SD}=72$, $N_{COL}=18$, $N_{ROW}=4 \times N_{BPSCS}$, and $N_{ROT}=18$.

12. The non-transitory computer-readable medium according to claim 10, wherein the first RU comprises a 26-tone RU and a 106-tone RU, and wherein:
when a dual-carrier modulation mode is unused, $N_{SD}$ is 126, $N_{ROT}$ is a positive integer between 29 and 58; or
when the dual-carrier modulation mode is used, $N_{SD}$ is 63.

13. The non-transitory computer-readable medium according to claim 10, wherein the first RU comprises a 26-tone RU and a 106-tone RU, and wherein a value of $N_{ROW}$ when the dual-carrier modulation mode is unused is twice a value of $N_{ROW}$ when the dual-carrier modulation mode is used.

14. The non-transitory computer-readable medium according to claim 12, wherein when the dual-carrier modulation mode is unused, $N_{ROT}=31$.

15. A computer program product comprising programming instructions stored in embodied on a non-transitory computer readable storage medium for enabling a computer to perform operations comprising:
inputting bits in a coded bitstream into a first tone mapper, wherein the coded bitstream is allocated to a first resource unit (RU) for a first user, wherein the first RU comprises M RUs, and M is an integer greater than 1; and
reordering the bits in the coded bitstream by using the first tone mapper, wherein a number $N_{SD}$ of data subcarriers of the first tone mapper is a positive integer within $[N_{SD\_min}/Q, N_{SD\_max}/Q]$, wherein $N_{SD\_min}$ is a sum of data subcarriers comprised in the first RU, $N_{SD\_max}$ is a sum of subcarriers comprised in the first RU, and Q is a number of data subcarriers to which a bit is mapped.

16. The computer program product according to claim 15, wherein a tone mapping distance parameter $D_{TM}$ of the first tone mapper is a divisor of $N_{SD}$.

17. The computer program product according to claim 16, wherein the operations further comprises:
determining $D_{TM}$ based on:
selecting the $D_{TM}$ from $[D_{TM\_min}, D_{TM\_max}]$, wherein $D_{TM\_min}$ is a tone mapping distance parameter corresponding to a second tone mapper corresponding to an RU that comprises $N_{SD}-1$ data subcarriers, and $D_{TM\_max}$ is a tone mapping distance parameter corresponding to a third tone mapper corresponding to an RU in which a number of comprised data subcarriers is greater than $N_{SD}$ and is the closest to $N_{SD}$; or
a ratio $N_{SD}/N_{COL}$ of a first interleaver with a same RU size as the first tone mapper.

18. The computer program product according to claim 16, wherein the first RU comprises a 26-tone RU and a 52-tone RU, and wherein
when a dual-carrier modulation mode is unused, $N_{SD}=72$, and $D_{TM}$ is 4; or
when the dual-carrier modulation mode is used, $N_{SD}=36$, and $D_{TM}$ is 3.

19. The computer program product according to claim 16, wherein the first RU comprises a 26-tone RU and a 106-tone RU, and wherein
when a dual-carrier modulation mode is unused, $N_{SD}$ is 126; or
when the dual-carrier modulation mode is used, $N_{SD}$ is 63.

20. The computer program product according to claim 16, wherein the first RU are M 242-tone RUs, and wherein:
when M=2, $N_{SD}$ is 468 and $D_{TM}$ is 12 when a dual-carrier modulation mode is unused, and $N_{SD}$ is 234 and $D_{TM}$ is 9 when the dual-carrier modulation mode is used;
when M=3, $N_{SD}$ is 702 and $D_{TM}$ is 18 when a dual-carrier modulation mode is unused, and $N_{SD}$ is 351 and $D_{TM}$ is 9 when the dual-carrier modulation mode is used; or
when M=4, $N_{SD}$ is 980 and $D_{TM}$ is 20 when a dual-carrier modulation mode is unused, and $N_{SD}$ is 490 and $D_{TM}$ is 14 when the dual-carrier modulation mode is used.

21. A non-transitory computer-readable recording medium storing programming instructions executable by a computer to perform operations comprising:
inputting bits in a coded bitstream into a first tone mapper, wherein the coded bitstream is allocated to a first resource unit (RU) for a first user, wherein the first RU comprises M RUs, and M is an integer greater than 1; and
reordering the bits in the coded bitstream, wherein a number $N_{SD}$ of data subcarriers of the first tone mapper is a positive integer within $[N_{SD\_min}/Q, N_{SD\_max}/Q]$, wherein $N_{SD\_min}$ is a sum of data subcarriers comprised in the first RU, $N_{SD\_max}$ is a sum of subcarriers comprised in the first RU, and Q is a number of data subcarriers to which a bit is mapped.

22. The non-transitory computer-readable medium according to claim 21, wherein a tone mapping distance parameter $D_{TM}$ of the first tone mapper is a divisor of $N_{SD}$.

23. The non-transitory computer-readable medium according to claim 22, wherein the operations further comprising:
determining $D_{TM}$ based on:
selecting the $D_{TM}$ from $[D_{TM\_min}, D_{TM\_max}]$, wherein $D_{TM\_min}$ is a tone mapping distance parameter corresponding to a second tone mapper corresponding to an RU that comprises $N_{SD}-1$ data subcarriers, and $D_{TM\_max}$ is a tone mapping distance parameter corresponding to a third tone mapper corresponding to an RU in which a number of comprised data subcarriers is greater than $N_{SD}$ and is the closest to $N_{SD}$; or
a ratio $N_{SD}/N_{COL}$ of a first interleaver with a same RU size as the first tone mapper.

24. The non-transitory computer-readable medium according to claim 22, wherein the first RU comprises a 26-tone RU and a 52-tone RU, and wherein
when a dual-carrier modulation mode is unused, $N_{SD}=72$, and $D_{TM}$ is 4; or
when the dual-carrier modulation mode is used, $N_{SD}=36$, and $D_{TM}$ is 3.

25. The non-transitory computer-readable medium according to claim 22, wherein the first RU comprises a 26-tone RU and a 106-tone RU, and wherein when a dual-carrier modulation mode is unused, $N_{SD}$ is 126; or
when the dual-carrier modulation mode is used, $N_{SD}$ is 63.

26. The non-transitory computer-readable medium according to claim 22, wherein the first RU comprises M 242-tone RUs, and wherein:
- when M=2, $N_{SD}$ is 468 and $D_{TM}$ is 12 when a dual-carrier modulation mode is unused, and $N_{SD}$ is 234 and $D_{TM}$ is 9 when the dual-carrier modulation mode is used;
- when M=3, $N_{SD}$ is 702 and $D_{TM}$ is 18 when a dual-carrier modulation mode is unused, and $N_{SD}$ is 351 and $D_{TM}$ is 9 when the dual-carrier modulation mode is used; or
- when M=4, $N_{SD}$ is 980 and $D_{TM}$ is 20 when a dual-carrier modulation mode is unused, and $N_{SD}$ is 490 and $D_{TM}$ is 14 when the dual-carrier modulation mode is used.

* * * * *